United States Patent
Perotti

(10) Patent No.: US 10,946,703 B2
(45) Date of Patent: Mar. 16, 2021

(54) TOW BAR APPARATUS AND METHOD

(71) Applicant: etrailer Corporation, Wentzville, MO (US)

(72) Inventor: Daniel Perotti, St. Charles, MO (US)

(73) Assignee: ETRAILER CORPORATION, Wentzville, MO (US)

( * ) Notice: Subject to any disclaimer, the term of this patent is extended or adjusted under 35 U.S.C. 154(b) by 399 days.

(21) Appl. No.: 15/903,798

(22) Filed: Feb. 23, 2018

(65) Prior Publication Data

US 2019/0263203 A1 Aug. 29, 2019

(51) Int. Cl.
| | | |
|---|---|---|
| *B60D 1/02* | (2006.01) | |
| *B60D 1/167* | (2006.01) | |
| *B60D 1/54* | (2006.01) | |

(52) U.S. Cl.
CPC ............ *B60D 1/1675* (2013.01); *B60D 1/02* (2013.01); *B60D 1/54* (2013.01)

(58) Field of Classification Search
CPC ........... B60D 4/1675; B60D 1/02; B60D 1/54
See application file for complete search history.

(56) References Cited

U.S. PATENT DOCUMENTS

| | | |
|---|---|---|
| 2,686,692 A | 8/1954 | Hunter et al. |
| 4,856,805 A | 8/1989 | Davis |
| 4,861,061 A | 8/1989 | Frantz |
| 4,961,590 A | 10/1990 | Davenport |
| 5,232,240 A | 8/1993 | Johnson |
| 5,516,140 A | 5/1996 | Hinte |
| 5,765,851 A * | 6/1998 | Parent .................... B60D 1/143 280/491.1 |
| 5,957,477 A | 9/1999 | Ensz et al. |
| 6,648,361 B2 | 11/2003 | Hulsey et al. |
| 6,764,092 B1 | 7/2004 | Greaves |
| 7,004,490 B2 | 2/2006 | Klar |

(Continued)

FOREIGN PATENT DOCUMENTS

FR 2757105 6/1998

OTHER PUBLICATIONS

Blue Ox Adventurer Tow Bar with Adjustable Width Arms—A-Frame—Car Mount—5,000 lbs.

(Continued)

*Primary Examiner* — Ruth Ilan
*Assistant Examiner* — Marlon A Arce
(74) *Attorney, Agent, or Firm* — Don V. Kelly; Evans & Dixon, L.L.C.

(57) ABSTRACT

A tow bar includes a shank. The proximal end of the shank is shaped and sized to releasably connect to a hitch receiver. The tow bar includes a first pivot coupler and second pivot coupler. The first pivot coupler preferably includes a first clevis rotatably connected to the distal end of the shank and connects the distal end of the shank to the proximal end of a pivot bar. The second pivot coupler connects the distal end of the pivot bar to a yoke having a proximal bracket and a distal bracket. A pair of arms connects to the distal bracket. Each arm is connected at its proximal end to the distal bracket via one of two third pivot couplers. Each third pivot coupler allows its connected arm to pivot in a substantially horizontal plane. Each third pivot coupler preferably includes a heim joint located at the proximal end of each arm.

18 Claims, 25 Drawing Sheets

(56) References Cited

U.S. PATENT DOCUMENTS

| | | |
|---|---|---|
| 7,032,919 B1 | 4/2006 | Hahne et al. |
| 7,125,031 B1 | 10/2006 | Schoonover |
| D544,412 S | 6/2007 | Roeber |
| 7,390,007 B2 | 6/2008 | Helms et al. |
| 7,445,226 B1 | 11/2008 | Hahne et al. |
| 7,461,855 B2 | 12/2008 | Klar |
| 7,506,889 B2 | 3/2009 | Baltrusaitis et al. |
| D612,772 S | 3/2010 | Goodman et al. |
| D612,773 S | 3/2010 | Merchant et al. |
| D615,006 S | 5/2010 | Goodman et al. |
| 7,942,435 B1 | 5/2011 | Huston et al. |
| 7,959,179 B1 | 6/2011 | Merchant |
| 7,988,179 B1 | 8/2011 | Goodman et al. |
| D650,400 S | 12/2011 | Merchant et al. |
| D658,097 S * | 4/2012 | Choquette .............. D12/162 |
| 8,276,930 B1 | 10/2012 | Hesse et al. |
| 8,366,137 B1 | 2/2013 | Merchant |
| 8,439,388 B1 | 5/2013 | Westervelt |
| 8,505,952 B1 | 8/2013 | Choquette |
| D693,746 S * | 11/2013 | Roeber .................. D12/162 |
| 8,573,629 B1 | 11/2013 | Kraai et al. |
| 8,662,523 B1 | 3/2014 | Merchant |
| 8,690,181 B1 | 4/2014 | Roeber |
| 8,833,790 B2 * | 9/2014 | Greenwood ........ B60D 1/1675 |
| | | 280/456.1 |
| 9,033,357 B1 | 5/2015 | Merchant |
| 9,592,711 B2 | 3/2017 | Fincher |
| 2006/0249926 A1 | 11/2006 | Smith |
| 2007/0194557 A1 | 8/2007 | Caporali et al. |
| 2008/0177435 A1 | 7/2008 | Caporali et al. |
| 2013/0076008 A1 * | 3/2013 | Su ........................... B60D 1/54 |
| | | 280/515 |
| 2014/0255135 A1 | 9/2014 | Roe |
| 2016/0082796 A1 * | 3/2016 | Fincher ................ B60D 1/54 |
| | | 280/474 |
| 2019/0225036 A1 * | 7/2019 | Westervelt ............ B60D 1/242 |

OTHER PUBLICATIONS

Blue Ox Ambassador Tow Bar—A-Frame—Car Mount—5,000 lbs.
Blue Ox Ambassador Tow Bar with Lunette Ring A-Frame—CAr Mount—7,500 lbs.
Roadmaster Tracker Tow Bar—2" Ball—5,000 lbs.
Tow Ready Adjustable Tow Bar 5,000 lbs.
Curt Tow Bar with Adjustable-Width Arms—Car Mount—2" Ball—5,000 lbs.
Blue Ox Allure Tow Bar—Pintle Style—A-Frame—Car Mount—10,000 lbs.
Blue Ox Trion Tow Bar—Lunette Ring—A-Frame—Car Mount—20,000 lbs.
Blue Ox Acclaim Tow Bar—A-Frame—Car Mount—5,000 lbs.
Roadmaster StowMaster Tow Bar—Car Mount—2-5/16" Ball—6,000 lbs.
Roadmaster StowMaster Tow Bar—Car Mount—2-½" Lunette Ring—6,000 lbs.
Roadmaster StowMaster Tow Bar—Car Mount—3" Lunette Ring—6,000 lbs.
Blue Ox Avail Tow Bar—Motorhome Mount—10,000 lbs.
Roadmaster Falcon 2 Tow Bar for Blue Ox Base Plates—Motorhome Mount—2" Hitch—6,000 lbs.
Blue Ox Alpha Tow Bar—Motorhome Mount—6,500 lbs.
Roadmaster Sterling All Terrain, Non-Binding Tow Bar—Motorhome Mount—2" Hitch—8K.
Roadmaster Falcon All Terrain, Non-Binding Tow Bar—Motorhome Mount—2" Hitch—6,000 lbs.
Roadmaster Falcon 2 Tow Bar—Motorhome Mount—2" Hitch—6,000 lbs.
Roadmaster BlackHawk 2 All Terrain, Non-Binding Tow Bar—Motorhome Mount—2" Hitch—10K.
Roadmaster Nighthawk All Terrain, Non-Binding Tow Bar w/LED Lights—RV Mount—8K.

* cited by examiner

TOW BAR APPARATUS AND METHOD

CROSS REFERENCE TO RELATED APPLICATION

Not applicable.

STATEMENT REGARDING FEDERALLY SPONSORED RESEARCH OR DEVELOPMENT

Not applicable.

SEQUENCE LISTING, TABLE OR COMPUTER PROGRAM ON COMPACT DISC

Not applicable.

FIELD OF INVENTION

This invention relates generally to towing accessories and devices and more specifically to tow bar assemblies for connecting a towing vehicle to a towed vehicle

BACKGROUND OF THE INVENTION

When traveling with a motor home, RV, or other towing vehicle it is often necessary to tow an auxiliary vehicle. The towing of one vehicle (the towed vehicle) by another (the towing vehicle) is accomplished using a device known as a tow bar or tow bar assembly (collectively referred to herein as a "tow bar"). A multitude of tow bars are disclosed in the prior art. In its most basic form, the typical tow bar is a Y-shaped device that includes a shank that removably inserts into and connects to a towing hitch receiver secured to the towing vehicle. The shank connects to a yoke to which two arms are pivotally attached to allow for horizontal abduction and adduction movement. Each arm connects to the yoke at its proximal end and contains at its distal end a coupler for attaching to a mounting bracket attached either directly to the front of the towed vehicle or on a base plate attached to the front of the towed vehicle. The front of the towed vehicle has two of these complementary attaching devices. This plurality of attaching devices allows for the Y-shaped tow bar to have two connection points to the towed vehicle. With two connection points on the towed vehicle, the tow bar provides for a more balanced and controlled tow of the towed vehicle than would a single connection. The pivotal attachment of the arms to the yoke allows motion in the horizontal plane, such that the arms may abduct or adduct and change the angle between them. Such pivotal movement provides the arms with the ability to spread to different widths to accommodate vehicles having differing widths between connection points.

In the prior art tow bar, the pair of arms connect to the yoke in an arrangement in which the arms separately connect to the yoke or in an arrangement in which the proximal ends of the arms each have coaxial apertures through which a common pivot pin is inserted. In either case, in the towing assembly of the prior art, the shank typically pivotally connects to the yoke via one pivot coupler that only allows pivotal movement in the vertical plane. Moreover, the proximal ends of the arms of the prior art tow bar are pivotally connected to the yoke in a manner that allows only for pivotal movement in the horizontal plane. To address this limitation of movement, some prior art tow bar devices provide for a connection at the yoke that allows for rotational motion about the longitudinal axis of the assembly. In some prior art tow bars, this provision for rotational motion is accomplished by tapering and enlarging the horizontally aligned through-hole in the shank that allows for a small degree of rotational motion or by way of an axially directed aperture in the yoke structure that rotatably receives a projection on the bracket holding the arms.

The arms on the prior art tow bar may also be extendable, a feature that improves the ability of the tow bar to connect to vehicles of differing widths. In this regard, the prior art discloses a tow bar in which the arms are composed of two main components, a proximal section including a housing into which a distal section telescopically inserts for storage purposes. Additionally, some prior art tow bars allow for the tow bar to be collapsed, folded or both into a stow position while installed in the towing hitch receiver of the towing vehicle.

The tow bar of the prior art has certain drawbacks. In one respect, the pivotal attachment arrangement between the arms and the shank is limited. The provision for rotational movement on the yoke and in a direction axially aligned with the shank can require elaborate machining or parts and can create a stress point. Another drawback of the prior art tow bar relates to the provision of extendable arms. In this respect the tow bar of the prior art typically uses one of two types of arm extension techniques. In one type, the tow bar arm comprises two rails having multiple apertures along their length. The rails have U-shaped cross-sections and are sized such that the rail with a smaller cross-section can fit and slide within the "U" of the rail with a larger cross-section. The smaller cross-section rail is slid out from the distal end of the larger cross-section rail to form an overall arm length. Bolts are placed in aligned holes in the rails to fix the rails into position with each other.

In the other type of tow bar, the arm comprises a proximal portion and a distal portion. The proximal portion has a housing into and out of which the distal portion, usually a bar, slides in and out. When the distal portion is fully inserted, the tow bar can be compactly stowed. With many prior art devices having a telescoping arm, the latching mechanisms that hold the distal section in place do not provide good visual indication that the distal section inserted into the housing is positively latched so as to prevent sliding in and out of the housing. This is particularly true when the arms of the tow bar are retracted and the tow bar is in the stowed or stowable configuration. Another drawback with the prior art tow bar is that when installed on the hitch receiver, the rattling of the tow bar while in the stowed position can cause the tow bar to shake free from its secured position. There is thus a need in the art for an improved tow bar that eliminates or reduces the foregoing deficits of the prior art.

SUMMARY OF THE INVENTION

In a first embodiment, the invention is directed to an improved tow bar for connecting a towing hitch receiver on a towing vehicle to a towed vehicle having two towing connectors. The embodiment tow bar comprises a shank. The shank preferably has a top side, a bottom side and two lateral sides such that it can insert into the hitch receivers currently in use that have a square cross section. However, the shank may be formed to have a cross section shaped to match that of any particular hitch receiver. The shank has a proximal end and a distal end. The proximal end of the shank is shaped and sized to releasably connect to the receiver of the towing hitch. The distal end of the hitch shank has a first pivot coupler. The first pivot coupler pivotally connects the hitch shank to a pivot bar that has a proximal end and a distal end. In the preferred embodiment, the first pivot coupler includes a first clevis on the distal end of the shank, the proximal end of the pivot bar (serving as the tang that is inserted into the first clevis) and a pivot pin slotted through the first clevis and proximal end of the pivot bar. The pivot pin can be any type of pin device such as, but not limited to, a lock pin or a shoulder pin. Additionally, in the preferred embodiment, the first clevis of the first pivot coupler is rotatably attached to the distal end of the shank such that the first clevis and the first pivot coupler can rotate about the longitudinal axis of the shank.

The distal end of the pivot bar is pivotally connected to a yoke by way of a second pivot coupler. The yoke includes a first portion having a proximal bracket and a second portion having a distal bracket. The proximal bracket is configured to pivotally hold the distal end of the pivot bar. In the preferred embodiment the proximal bracket is a second clevis with vertically opposing semi-circular plates. The second pivot coupler thus includes the distal end of the pivot bar, the second clevis (proximal bracket) and a pin inserted through the second clevis and the distal end of the pivot bar. The second pivot coupler allows pivotal movement in a direction substantially perpendicular to that of the first pivot coupler.

The tow bar further includes a pair of swing arms that each have a proximal end and a distal end. Each swing arm is pivotally connected to the yoke by way of a third pivot coupler that allows for pivotal movement in the horizontal plane. Each third pivot coupler preferably includes the proximal end of the swing arm, the distal bracket and a pin inserted through the swing arm and bracket. In the preferred embodiment the distal bracket is large enough such that each swing arm separately connects to the distal bracket at laterally displaced portions of the distal bracket that form third clevises. In this respect, each third pivot coupler would include the proximal end of the swing arm, a portion of the distal bracket forming a third clevis and a pin inserted through the swing arm and the third clevis. In the preferred embodiment, the pin comprises a bolt and lock nut that allows the arms to be removably connected to the yoke. In the preferred embodiment, the proximal end of the swing arm (and thus the third pivot coupler) includes a heim joint that gives the swing arm a degree of vertical pivotal movement ("play") that allows the swing arm to pivot horizontally and vertically relative to the bracket. In a preferred embodiment the distal end of each swing arm includes a coupler for attachment to one of the towing connectors on the towed vehicle.

In the preferred embodiment, the first pivot coupler allows for movement in the vertical direction and the second pivot coupler allows for movement in the horizontal direction. Additionally, in the preferred embodiment the swing arms are extendable. Each extendable swing arm includes a lock to hold the arm at an extended length. The lock is capable of assuming a locked and unlocked position and includes an indicator in the form of a handle visually indicating to the user when the lock is in the locked and unlocked position.

To reduce or eliminate the tow bar from shaking free when in the stowed position, the tow bar includes a mast with a spring enabled retention mechanism (a latch) that receives a catch button on the tow bar when in the folded position. By virtue of the spring retention mechanism, the tow bar is less likely to shake free from its stowed position as compared to the prior art.

In another embodiment, the invention is directed to a vehicle towing system. The embodiment system comprises a tow bar for connecting a towing hitch receiver, secured to a towing vehicle, to coupling members secured to a towed vehicle. The tow bar of the system includes a shank. The shank has a proximal end and a distal end. The proximal end of the shank is shaped and sized to releasably connect to the receiver tube of the towing hitch. A first pivot coupler includes a first clevis that is connected to the distal end of the hitch shank. In the preferred embodiment, the clevis of the first pivot coupler is rotatably attached to the distal end of the shank such that the pivot coupler itself can rotate about the longitudinal axis of the shank. The first pivot coupler pivotally connects the shank to a pivot bar that has a proximal end and a distal end. The distal end of the pivot bar pivotally connects to a yoke by way of a second pivot coupler. The yoke has a proximal bracket and a distal bracket. The second pivot coupler connects the distal end of the pivot bar to the proximal bracket on the yoke. In the preferred embodiment, the proximal bracket forms a second clevis. The second pivot coupler allows pivotal movement in a direction substantially perpendicular to that of the first pivot coupler.

The system further includes a plurality of interchangeable arm sets, each of the plurality of arm sets including a pair of swing arms. Each swing arm in each arm set has a proximal end and a distal end. The proximal end of each swing arm in each arm set is removably connectable to the bracket via a third pivot coupler. In the preferred embodiment, the pin of each third pivot coupler comprises a bolt and lock nut that allows the arms to be removably connected to the yoke. The third pivot coupler allows the swing arms to horizontally pivot. In a preferred embodiment, the distal end of each arm includes a coupler for attachment to the coupling member secured to the towed vehicle. The pair of arms in each interchangeable arm set has a drawing capacity different than the drawing capacity of the pairs of arms in the other arm sets of the plurality of arm sets. An alternate embodiment system could similarly include a set of removably attachable, interchangeable arms. In a preferred embodiment the set of removably attachable arms includes a swing arm including wiring allowing electrical coupling of the towing vehicle to the towed vehicle or to accessories such as lights. In the preferred embodiment of the system, the third pivot coupler includes a heim joint on the proximal end of the swing arm allowing the swing arm to pivot vertically relative to the bracket. Additionally, in the preferred embodiment system the swing arms are extendable. Each extendable swing arm includes a lock to hold the swing arm at an extended length. The lock is capable of assuming a locked and unlocked position and includes an indicator in the form of a handle visually indicating to the user when the lock is in the locked and unlocked position. The system may also include the latching arrangement described above.

The inventive tow bar and towing system have several attributes that are improvements over the prior art. The first is the utilization of three pivot couplers between the shank and each swing arm, creating independent indexing that is novel to the prior art. In conjunction with the rotatable attachment of the first pivot coupler to the shank, the inventive tow bar has a degree of motility not seen in the prior art tow bars. The second is the incorporation of heim joints as the connection points (in the third pivot couplers) for the swing arms. These heim joints allow for increased positioning ability when one is connecting and disconnecting the towed vehicle to the towing vehicle through the additional degree of freedom that the heim joints provide as compared to rigid configurations standard to the prior art. Another novel attribute of the invention is the incorporation of a visible "locked/unlocked" feature through the latch handle positioning. This mechanism allows one to clearly see if the tow bar's telescoping swing arms are in the unlocked or locked position for towing. The stow-position latch with spring retention is a further advancement over the prior art. By virtue of the spring retention mechanism, the likelihood of the tow bar shaking free from its stowed configuration is reduced as compared to the prior art. The embodiment system provides for interchangeable swing arm pairs that allows one to customize the tow bar according to the load being towed or add accessories as needed. In this regard, with the individual connection points for each telescoping swing arm assembly and the robust design capacity of the head unit, one has the ability to tailor the configuration to one's specific needs and easily move between weight configurations and accessories.

DETAILED DESCRIPTION

Figure 1:
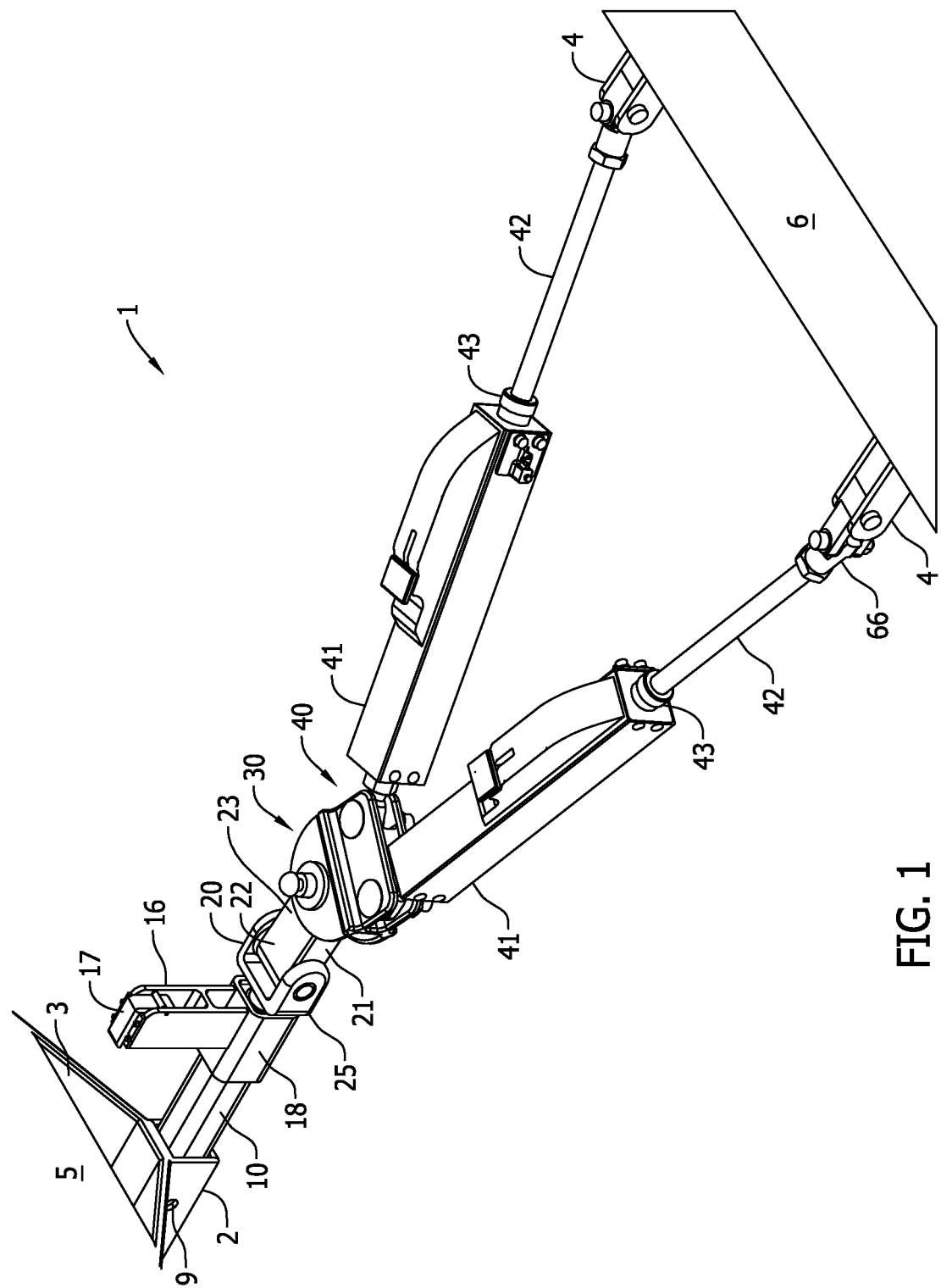
FIG. 1 is a perspective view of a preferred embodiment tow bar of the present invention, the tow bar is connected to a towing hitch receiver that is secured to a towing vehicle and to towing brackets secured to a towed vehicle.
Figure 2:
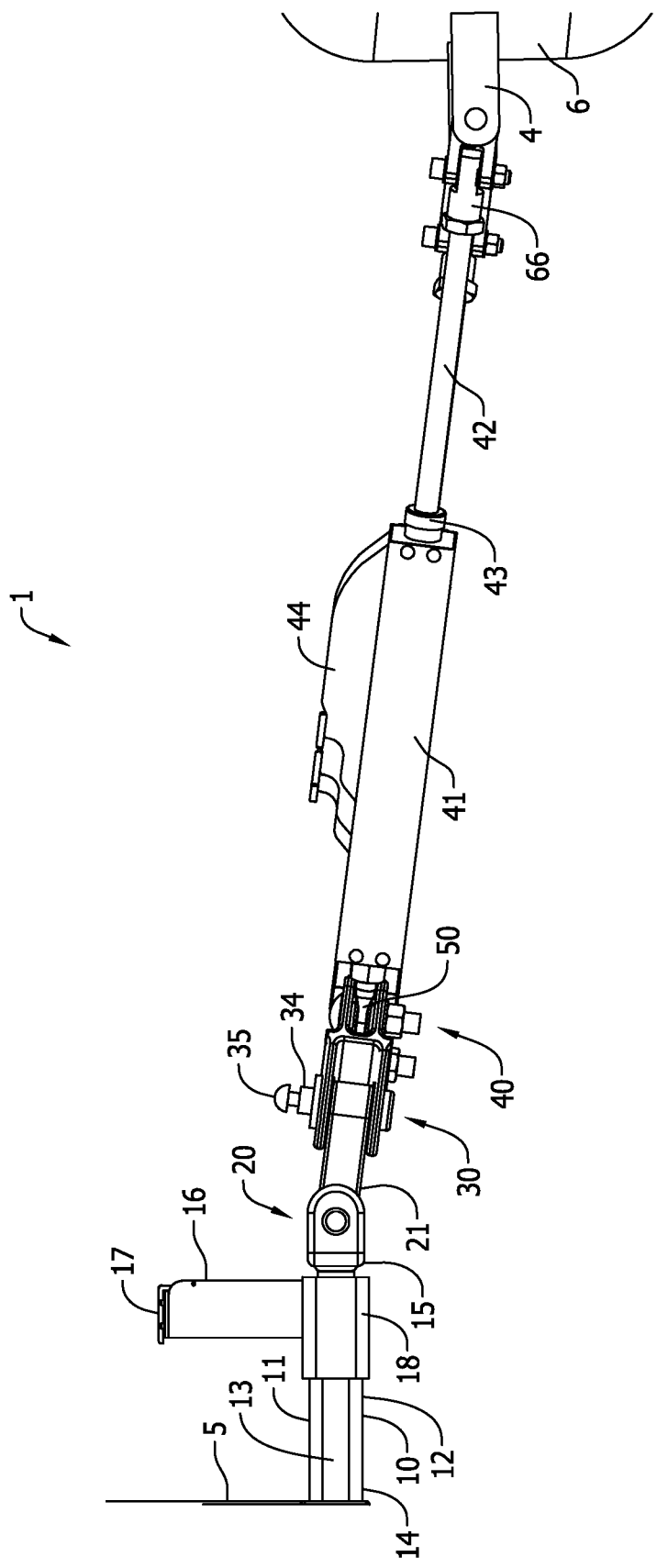
FIG. 2 is a side elevation view of a preferred embodiment tow bar of the present invention, the tow bar is connected to a towing hitch receiver on a towing vehicle and to towing brackets secured to a towed vehicle.
Figure 3:
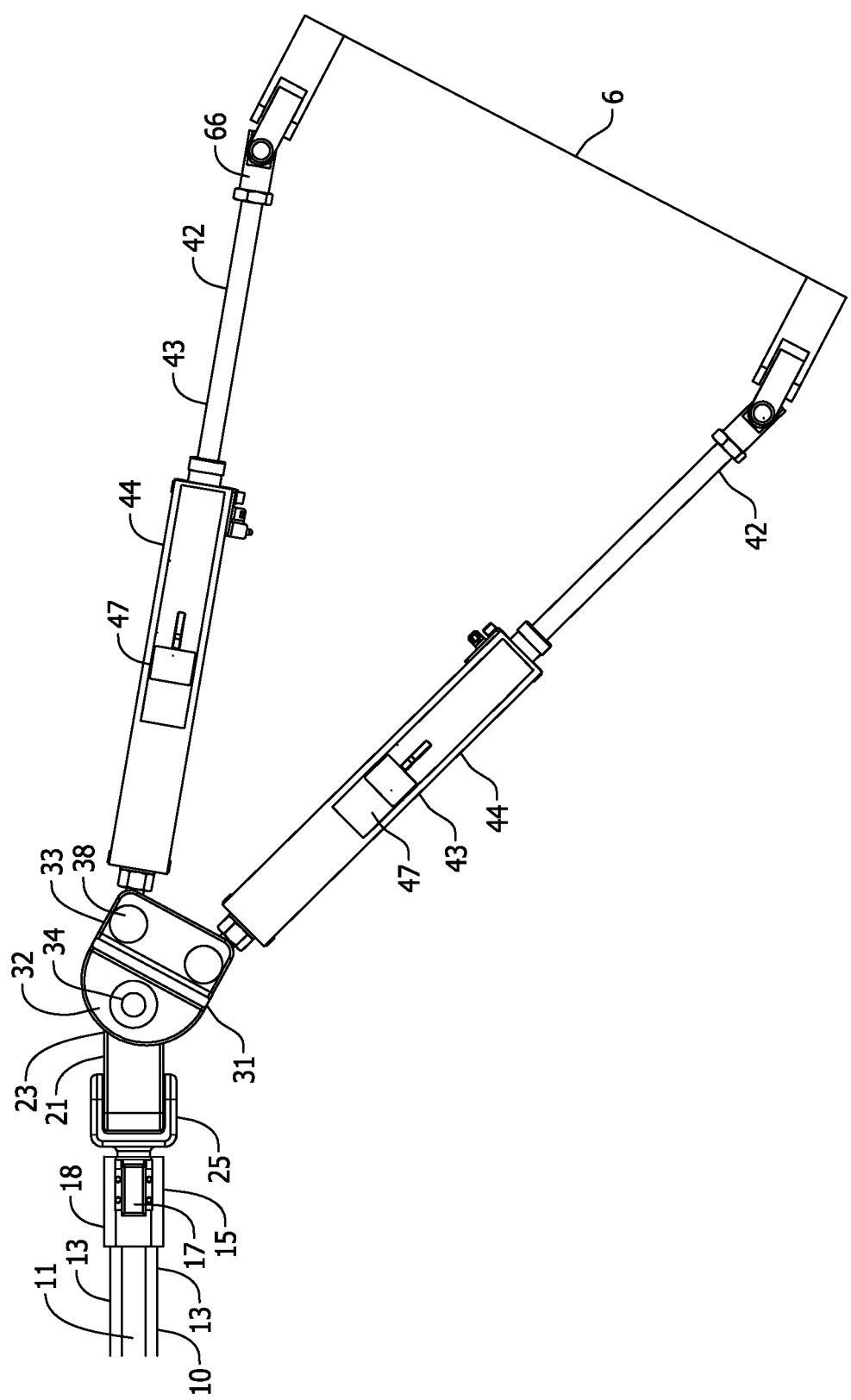
FIG. 3 is a top plan view of a preferred embodiment tow bar of the present invention, the tow bar is connected to the receiver on a towing hitch that is attached to a towing vehicle and to towing brackets secured to a towed vehicle.
Figure 4:
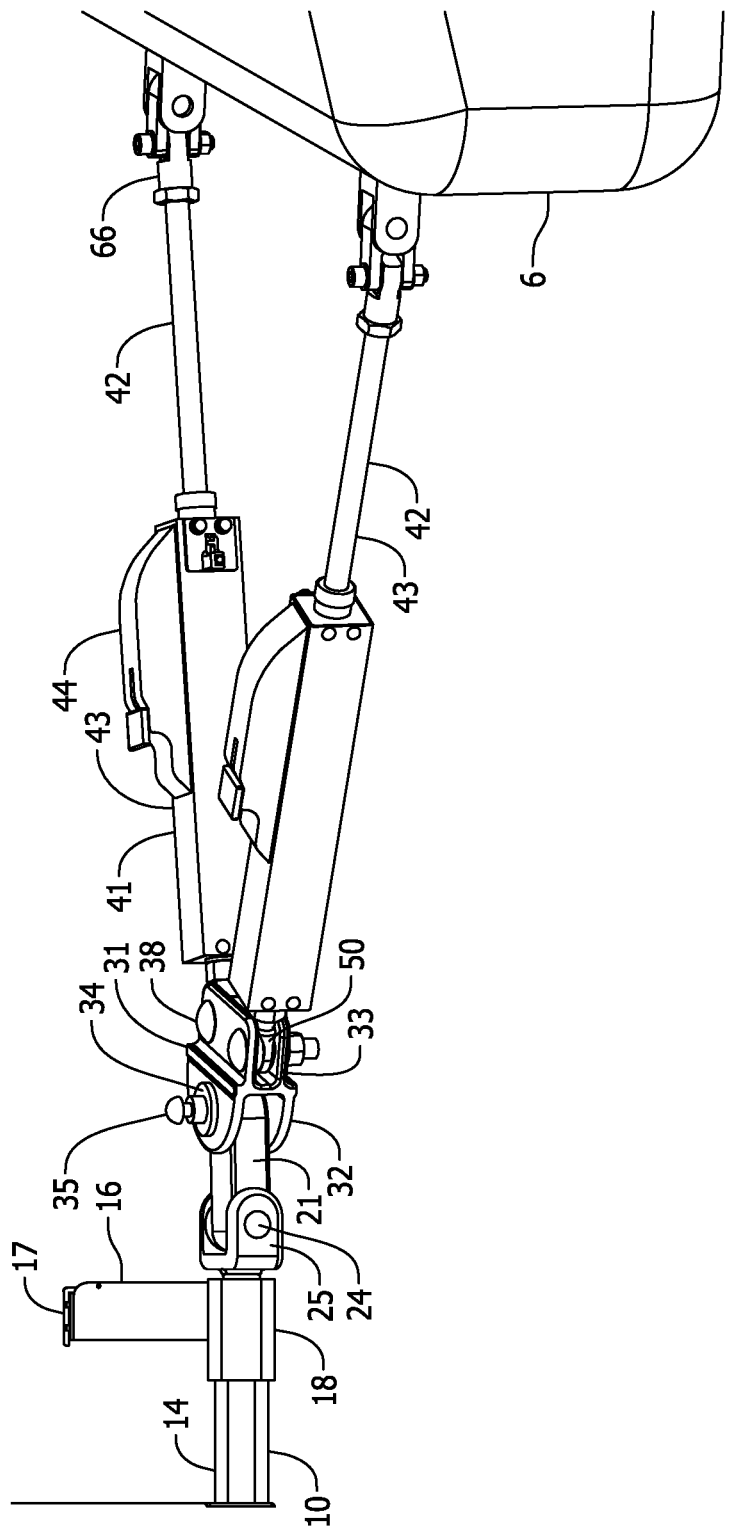
FIG. 4 is an alternate perspective view of a preferred embodiment tow bar of the present invention, the tow bar is connected to a towing hitch that is bolted to a towing vehicle and to towing brackets secured to a towed vehicle.
Figure 17:
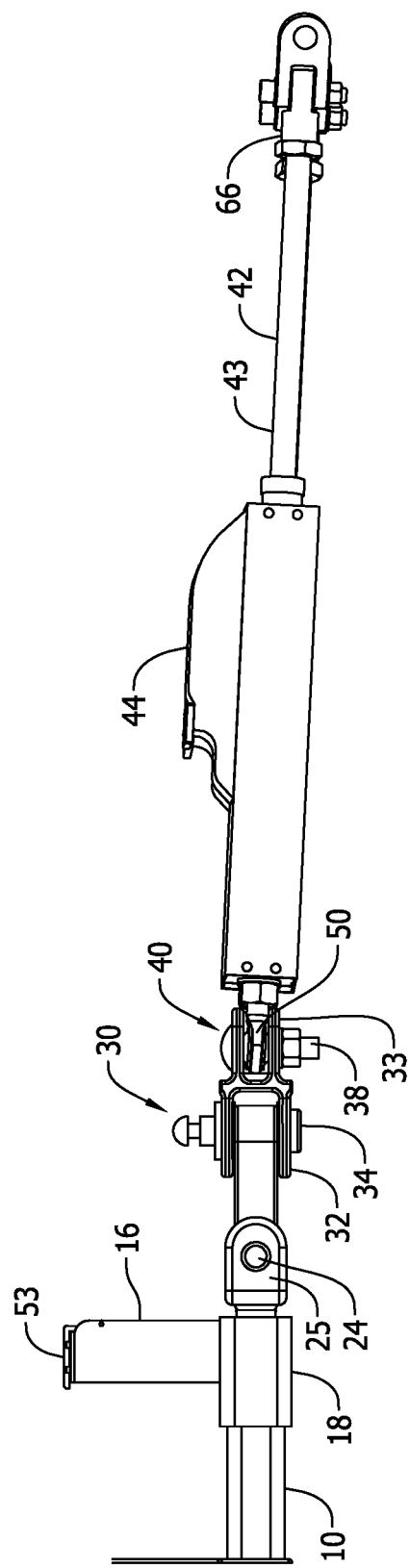
FIG. 17 is a side elevation view of a preferred embodiment tow bar of the present invention, the tow bar is connected to a towing hitch receiver but is not secured to a towed vehicle. The vertical play (drop) of the swing arm afforded by the heim joint of the third pivot coupler is visible from the shown aspect.
Figure 18:
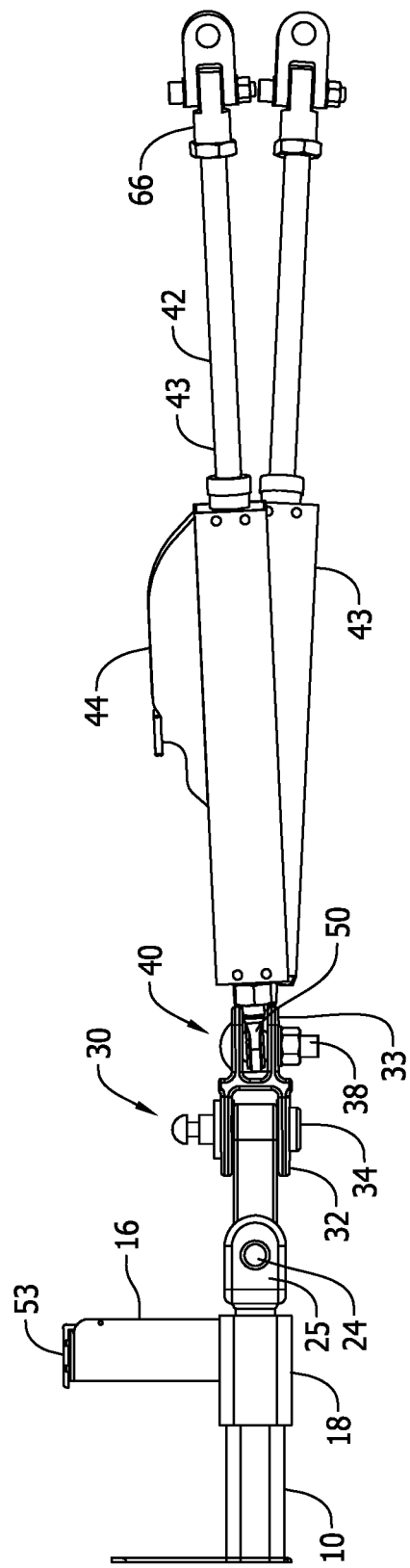
FIG. 18 is a side elevation view of a preferred embodiment tow bar of the present invention, the tow bar is connected to a towing hitch receiver but is not secured to a towed vehicle. The individual vertical play afforded by the heim joint of the third pivot coupler to each of the swing arms of the tow bar is visible from the shown aspect.

FIGS. 1-20 depict a preferred embodiment of the present invention tow bar 1 and systems 100, 200 along with their preferred features. As is seen in the figures, the inventive tow bar 1 includes a shank 10 that is sized and shaped to be inserted into the receiver 2 of towing hitch receiver 3 mounted on towing vehicle 5. In practical use, towing vehicle 5 will normally be situated upon a roadway surface considered horizontal in reference to the towing vehicle. Thus, the directional terms "vertical" and "horizontal" and the like are used to describe the tow bar 1 and its components with respect to the orientation illustrated in FIGS. 1-18 and are employed merely for the purposes of clarity and illustration. For example, FIG. 2 shows tow bar 1 in its "neutral" position when shank 10 of tow bar 1 is inserted into receiver 2 and distal ends 42 of swing arms 43 are connected to towing brackets 4 on towed vehicle 6. In the orientation shown in FIG. 2, shank 10 projects "horizontally" out from receiver 2. Stowing mast 16 rises vertically upward from shank 10. Also, as is best shown in FIGS. 17 and 18, because of the inclusion of heim joints 50 in third pivot coupler 40 connecting swing arms 43 to yoke 31, swing arms 43 can deflect (limitedly pivot) "vertically" downward (and upward when lifted) due to the "vertical" play allowed by heim joint 50. The terms "vertical" and "vertically" mean a direction substantially normal to or away from the road surface on which towing vehicle 5 rests. The terms "horizontal" and "horizontally" mean a direction substantially parallel to that of the longitudinal axis of shank 10. The terms "substantially perpendicular" and "substantially parallel" mean with respect to a described orientation, structure or force, the stated orientation, structure or force is sufficiently perpendicular or parallel such that performance of the described orientation, structure or force, from the perspective of one with ordinary skill in the art, is the same as though the orientation, structure or force is precisely perpendicular or parallel. The directional terms "proximal" and "distal" and the like are used herein with respect to the described tow bar to refer to positions and locations on the tow bar relative to receiver 2 when holding tow bar 1.

A preferred embodiment tow bar 1 of the present invention will now be explained with reference to the figures. As shown in FIGS. 1-18, in one aspect the present invention is directed to a tow bar 1 for connecting a towing hitch 3 on a towing vehicle 5 to a towed vehicle 6 having two towing brackets 4. Tow bar 1 comprises shank 10. Shank 10 preferably has top side 11, bottom side 12 and two lateral sides 13 in order to securely insert into a hitch receiver having a complementary cross section. However, the cross-sectional shape of the shank can be modified to fit the cross-sectional shape of a particular hitch receiver. Shank 10 has proximal end 14 and distal end 15. Proximal end 14 of shank 10 is shaped and sized to releasably connect to (insert into) receiver (a/k/a receiving tube) 2 of towing hitch 3. In the standard arrangement, shank 10 is a hollow rectangular tube and so is hitch receiver 2. The inner dimension of receiver 2 is slightly larger than the outer dimension of shank 10 so as to allow shank 10 to be slidably inserted into and received by receiver 2. Shank 10 is inserted into hitch receiver 2 and held in receiver 2 by way of a locking pin (not shown) inserted into aligned holes 8, 9 respectively located in the lateral sides 13 of shank 10 and receiver 2.

Figure 20:
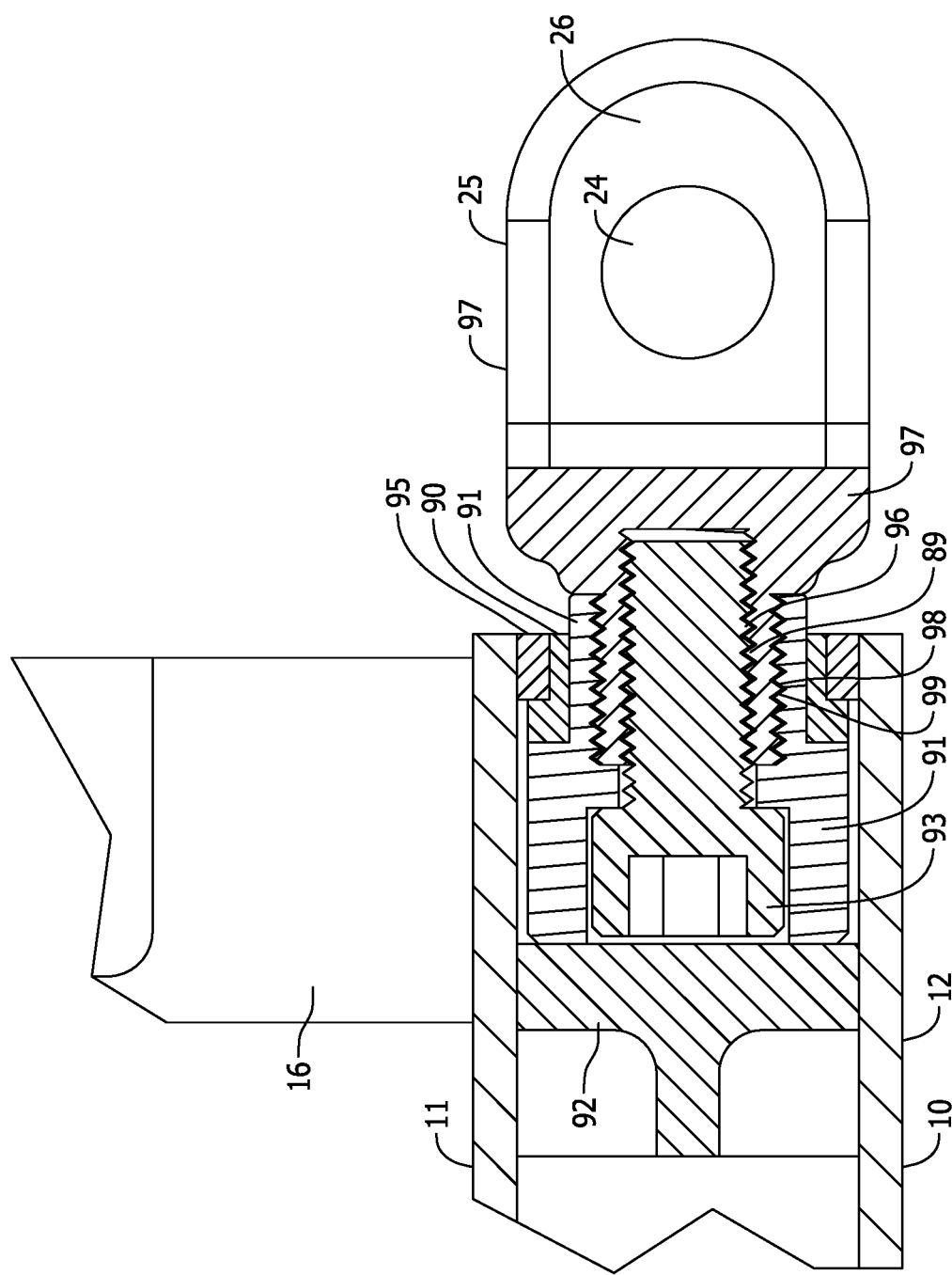
FIG. 20 is a fragmentary phantom view showing a preferred embodiment tow bar having an exemplary attachment method of a first clevis that is rotatably attached to the distal end of the shank. The image shows an exemplary way of rotatably attaching the clevis to the shank.

As explained in more detail below, tow bar 1 preferably includes stowing mast 16 that rises vertically upward from shank 10. The figures show an exemplary manner in which shank 10 may be connected to shank 10. In the depicted embodiment, stowing mast 16 is welded to collar 18 that is in turn fixedly attached to shank 10. Stowing mast includes spring actuated retention latch 17 that holds catch button 35 on pivot pin 34. First pivot coupler 20 connects distal end 15 of hitch shank 10 to pivot bar 21. In the depicted preferred embodiment, first pivot coupler includes a first clevis 25 attached to distal end 15 of shank 10, pin 24 and proximal end 22 of pivot bar 21. Proximal end 22 of pivot bar 21 forms the tang component of the understood clevis coupling and in this respect proximal end 22 of pivot bar 21 inserts between plates 26 of first clevis 25 and is retained by pin 24 inserted through a coaxial hole (not shown) in plates 26 and proximal end 22. In an alternate embodiment, pin 24 may comprise components such as a bolt and nut to make pivot bar 21 removably securable to first clevis 25. As shown in FIG. 20, in the preferred embodiment, first clevis 25 (and thus first pivot coupler 20) is rotatably attached to distal end 15 of the shank 10 such that first pivot coupler 20 (and the remainder of tow bar 1 distal to first pivot coupler 20) rotates about the longitudinal axis of shank 10.

FIG. 20 depicts an exemplary manner in which clevis 25 may be rotatably attached to shank 10. This depiction is not meant to be limiting as to attachment methods. In this respect, distal end 15 of shank 10 includes retention lip 95 formed or welded onto the inner surface of sides 11, 12, 13 of shank 10. Bushing 90 is retained inside shank 10 by retention lip 95. Bushing 90 is preferably made of bronze and pressed into position within retention lip 95. Bushing 90 includes an aperture through which clevis cap 91 inserts and may rotate. Clevis cap 91 includes internal threads 99. Base portion 97 of clevis 25 has external threads 98 that match internal threads 99 of clevis cap 91. In addition, the proximal end of clevis 25 has internal threads 89. A socket head cap screw 93 is inserted through the aperture 94 in clevis cap 91 and its threads 96 engage the internal threads 89 in clevis cap 25. Threads 89 and 99 are non-congruent threads. This ensures that clevis 25, once properly torqued, cannot rotate free from the distal end 15 of shank 10 as the threads will never line up so that both joints can be loosened. Rear capture block 92 is secured into the interior of shank 10 to hold the aforementioned structure in place. Thus, the rotating structures housed within distal end 15 of shank 10 are trapped between retention lip 95 and capture block 92.

Pivot bar 21 also has distal end 23 which is part of second pivot coupler 30. Second pivot coupler 30 pivotally connects distal end 23 of pivot bar 21 to yoke 31. Yoke 31 comprises proximal bracket 32 and distal bracket 33. In the preferred embodiment, proximal bracket 32 of yoke 31 is a second clevis having two vertically opposed semi-circular plates 36 having aligned apertures (not shown). Distal end 23 of pivot bar 21 is inserted between plates 36 of second clevis 32. Distal end 23 of pivot bar 21 has a vertical through-hole that aligns with holes on plates 36. Pin 34 (preferably a shoulder pin) is inserted into and through the aligned holes of pivot bar 21 and plates 36 to pivotally retain pivot bar 21 within plates 36 of second clevis (proximal bracket) 32 of yoke 31, thus forming second pivot coupler 30. In the shown preferred embodiment, first pivot coupler 20 allows for movement in the vertical direction and second pivot coupler 30 allows for movement in the horizontal direction. Second pivot coupler 30 allows pivotal movement in a direction substantially perpendicular to that of first pivot coupler 20. In an alternate embodiment, pin 34 may also comprise components such as a bolt and nut to make distal end 23 of pivot bar 21 removably securable to bracket 32 of yoke 31.

Tow bar 1 further includes a pair of third pivot couplers 40. Third pivot couplers 40 pivotally connect proximal ends 41 of swing arms 43 to distal bracket 33 of yoke 31. More specifically and as can be best seen in FIGS. 19A and 19B, distal bracket 33 of yoke 31 independently receives each swing arm 43 at separate laterally displaced portions 33a, 33b of distal bracket 33. In the preferred embodiment, laterally displaced portions 33a, 33b form third clevis structures on yoke 31 having two vertically opposing plates 37 with a pair of aligned apertures 39. A pin 38, shown in the preferred form of depicted carriage bolt 38a, and lock nut 38b, is used to removably secure each swing arm 43 to displaced portions 33a, 33b. Bolt 38a is inserted through each pair of aligned apertures 39 and a complementary through-hole 52 in proximal end 41 to retain proximal end 41 of swing arm 43 within third clevises 33a, 33b of bracket 33 of yoke 31. Each third pivot coupler 40 thus preferably includes pin 38 (preferably in the form of bolt 38a and lock nut 38b), proximal end 41 of swing arm 43 and a portion (third clevises 33a, 33b) of distal bracket 33 that includes apertures 39. If bolt 38a is employed as part of a pin 38 in a third pivot coupler 40, then lock nut 38b should be utilized to retain bolt 38a on distal bracket 33.

In the preferred embodiment shown in the figures, proximal end 41 of swing arm 43 includes heim joint 50. A heim joint is also known as a rod end bearing or rose joint. By providing for a heim joint in each third pivot coupler 40, swing arm 43 can pivot widely horizontally, but can also limitedly pivot vertically relative to yoke 31. A typical pivot range is approximately 20 degrees (ten degrees up and ten degrees down in the orientation shown in the figures.)

By utilizing three pivot couplers between a swing arm and the tow bar shank, the inventive tow bar provides for an enhanced degree of motility among tow bar structures that makes connecting the tow bar to vehicles easier than with prior art devices. The incorporation of heim joints as the connection points (in the third pivot couplers) for the swing arms adds to the enhanced motility of the tow bar over the prior art. These heim joints allow for increased positioning ability when one is connecting and disconnecting the towed vehicle to the towing vehicle through the additional degree of freedom that the heim joints provide as compared to rigid configurations standard to prior art. The enhanced motility provided by the three pivot coupler structure and the inclusion of heim joints at the two third pivot couplers, is even further enhanced by virtue of the rotatable attachment of the first pivot coupler to the shank. With the rotatable attachment and the three pivot coupler structure, the tow bar not only improves the tow bar connection process, but provides for improvement over prior art tow bars when towing on uneven surfaces.

In the depicted preferred embodiment, each swing arm 43 is extendable and includes lock 46 to hold the swing arm at its extended length. Lock 46 is capable of assuming a locked and unlocked position and includes an indicator in the form of handle 47 visually indicating when lock 46 is in the locked and unlocked position. Distal end 42 of each arm 43 preferably includes a coupler 66 for connection to one of the towing bracket 4 on towed vehicle 6.

Figure 14:
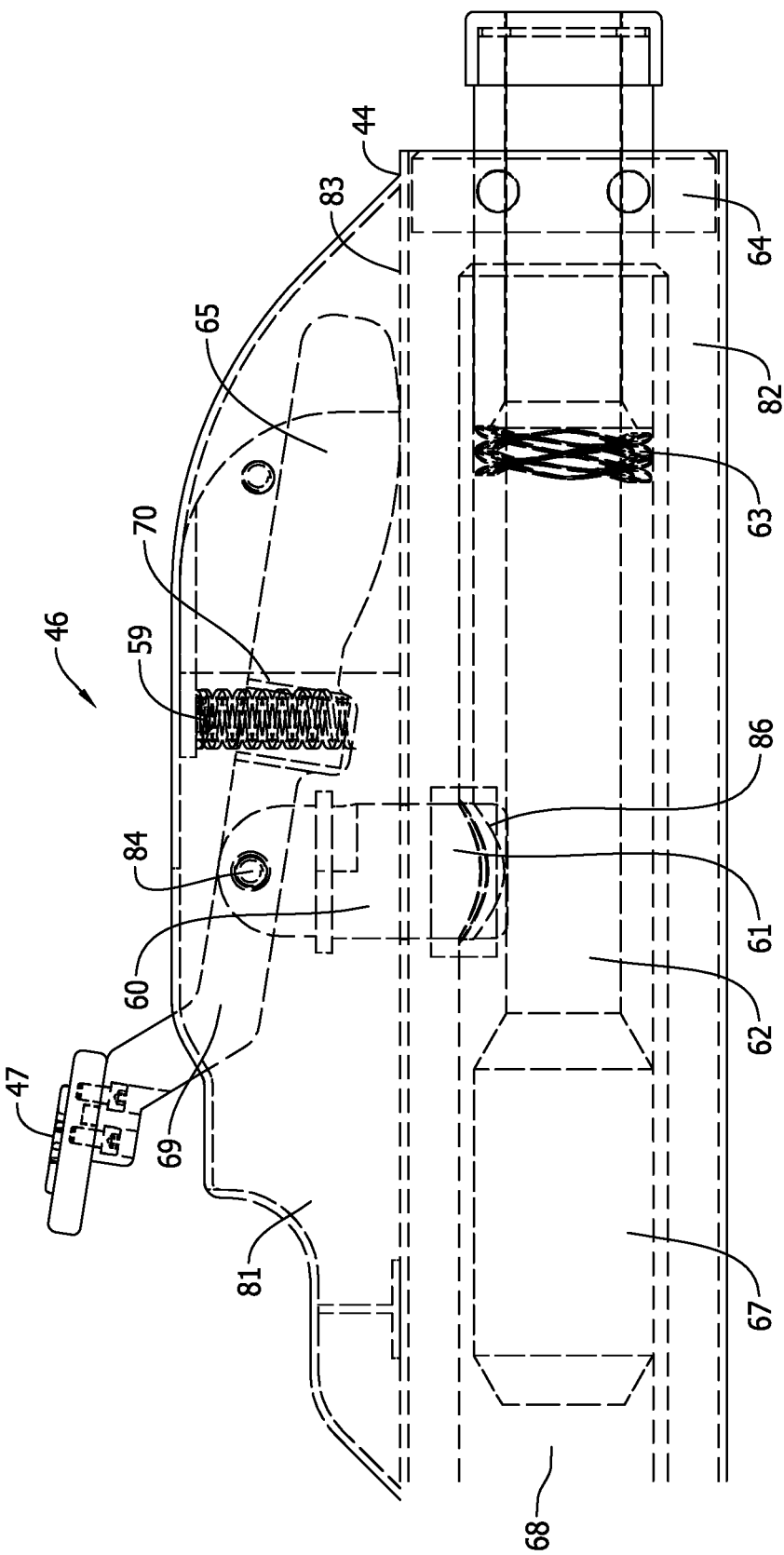
FIG. 14 is a fragmentary side elevation view showing the section of a swing arm of the tow bar containing the arm extension lock, the interior of the lock is shown in phantom view so as to show the structural components of a preferred embodiment arm extension lock. The lock is holding the distal portion of the swing arm in its retracted position.
Figure 15:
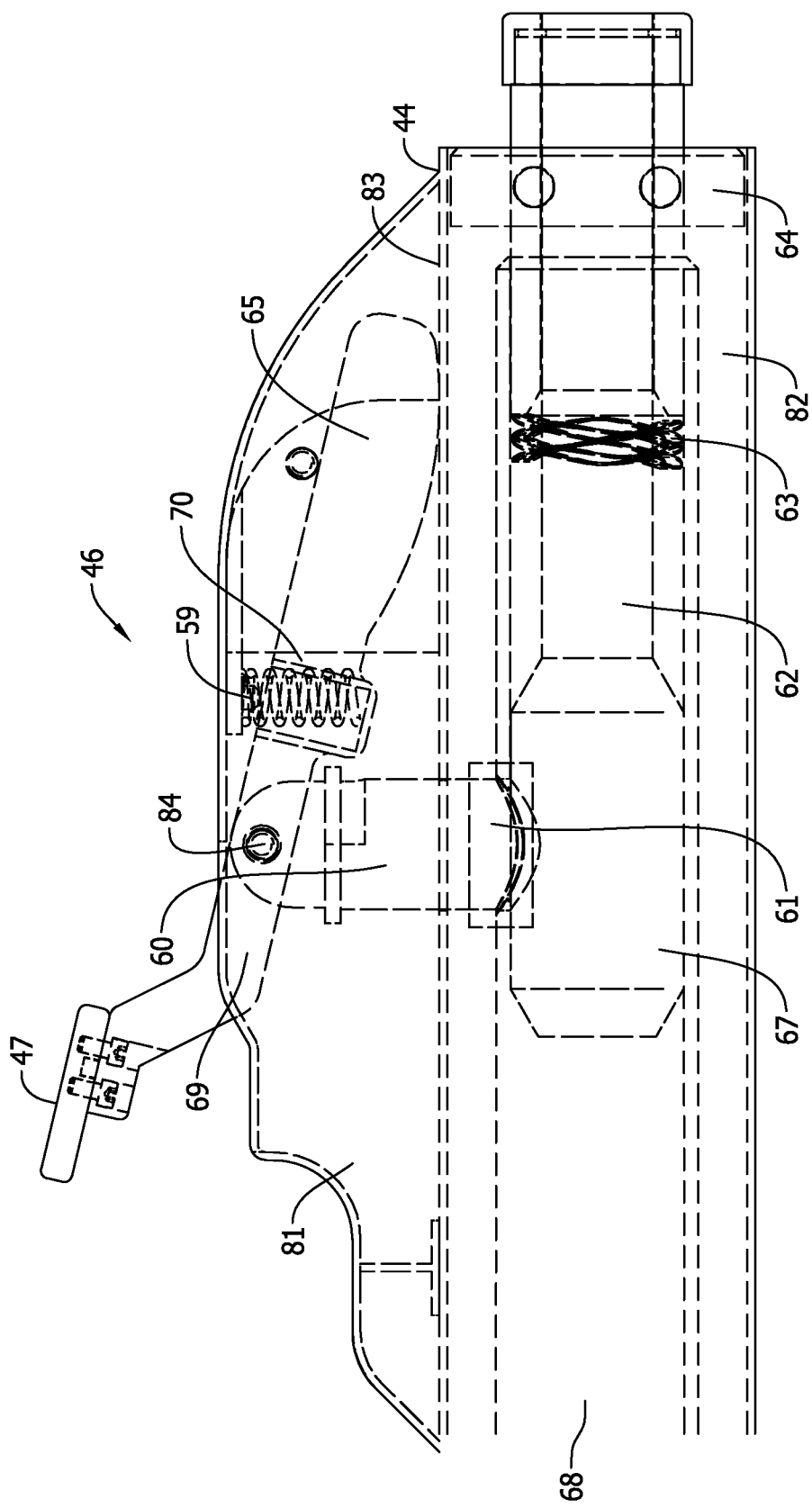
FIG. 15 is a fragmentary side elevation view showing the section of a swing arm of the tow bar containing the arm extension lock, the interior of the lock is shown in phantom view so as to show the structural components of a preferred embodiment arm extension lock that retains the distal portion of the swing arm. In the view shown, the distal portion of the swing arm is being pulled out of the housing on the proximal portion of the swing arm from its retracted position to a deployed position.
Figure 16:
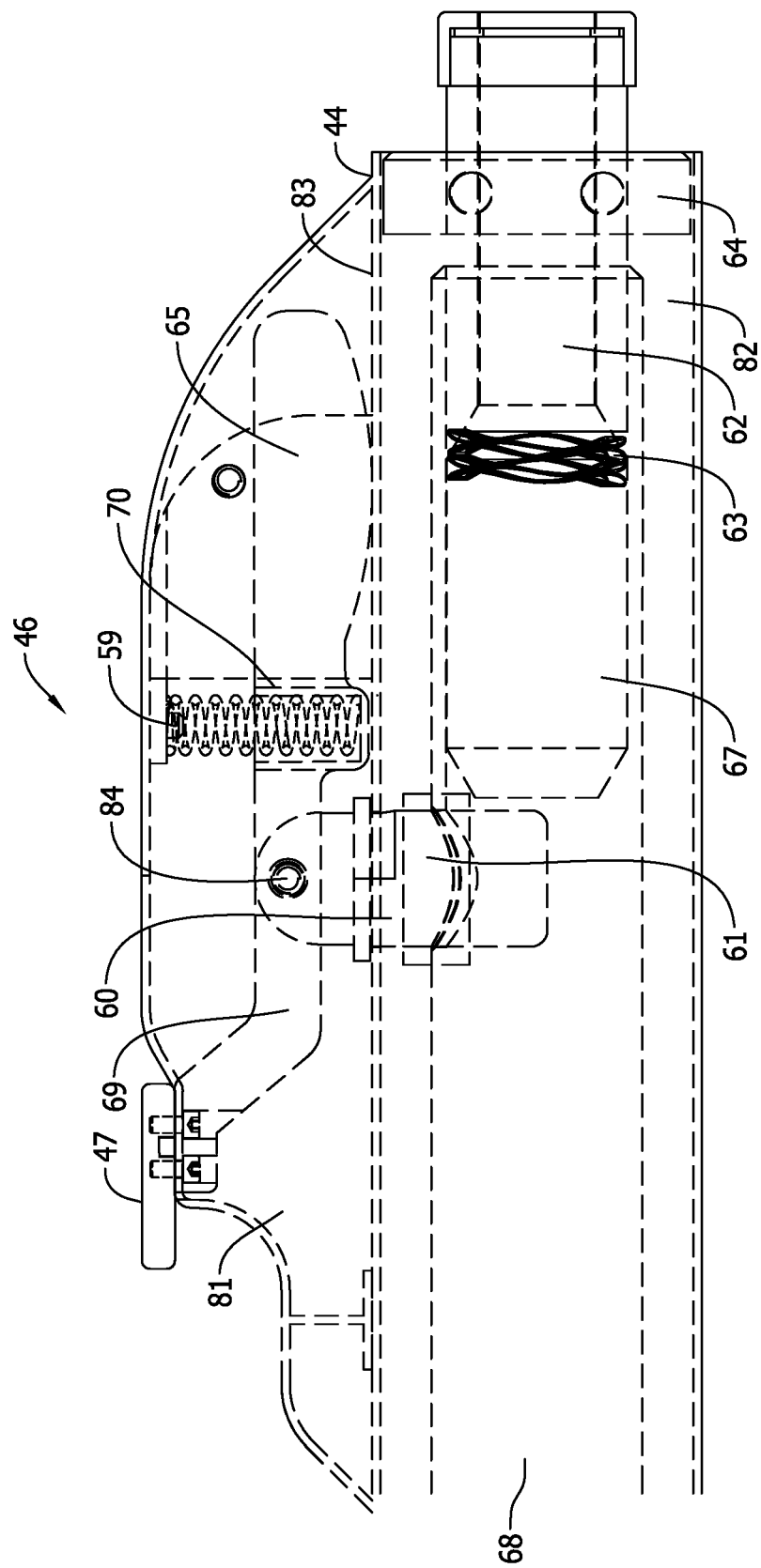
FIG. 16 is a fragmentary side elevation view showing the section of a swing arm of the tow bar containing the arm extension lock, the interior of the lock is shown in phantom view so as to show the structural components of a preferred embodiment arm extension lock that retains the distal portion of the swing arm. In the view shown, the distal portion of the swing arm has been pulled out of the housing on the proximal portion of the swing arm from its retracted position to an extended position.

FIGS. 14-16 depict the components of a preferred embodiment leg extension lock 46. As shown in these figures, lock 46 comprises housing 44 which is divided into an upper housing 81 and lower housing 82. Upper housing 81 holds locking bar 69 that includes handle 47 and rocker end 65 that rests and pivots upon floor 83 of upper housing 81. Locking bar 69 is pivotally attached to depending plunger 60. Spring 59 is attached to ceiling 85 of upper housing 81 and depends downwardly therefrom and into nesting cavity 70 on locking bar 69. Spring 59 is formed to provide a downward pushing force against locking bar 69. Housing 44 and its constituent upper housing 81 and lower housing 82 are formed such that plunger 60 can travel vertically from upper housing 81 and into chamber 68 in lower housing 82 via guide hole 61. Chamber 68 is preferably cylindrical.

Chamber 68 slidably contains distal arm shaft 62 which respectively moves into and out of chamber 68 to retract and extend swing arm 43. Shaft 62 includes enlarged terminus 67 which in conjunction with plunger 60 operates to prevent distal end 42 of swing arm 43 from sliding in and out of housing 44. As shown in FIG. 14, when shaft 62 of distal end 42 is retracted in lower housing 82, plunger 60 is in a first position in which bottom 86 of plunger 60 presses against shaft 62, thus preventing shaft 62 from moving longitudinally in chamber 68. Swing arm 43 is now in the retracted configuration. When swing arm 43 is in the retracted configuration, locking bar 69 is in an angled up position resulting in handle 47 to be in a noticeably raised position above housing 44.

As shown in FIG. 15, by pulling shaft 62 out of lower housing 82, handle 47 of locking arm 69 is lifted upward. In this respect, as locking arm 69 is lifted, plunger 60 rises to a second position, which is a point at which enlarged terminus 67 is moved toward collar 64 at the distal end of lower housing 82. Once shaft 62 is pulled out far enough, terminus 67 moves past plunger 60, allowing plunger 60 to descend into chamber 68. Plunger 60 is now in a third position and tow bar 1 is in its extended configuration. This is shown in FIG. 16. When plunger 60 is in the third position, locking bar 69 drops to a low position causing handle 47 to descend with it and occupy a position visibly lower and closer to upper housing 81. By virtue of enlarged terminus 67 and reinforced guide collar 64, shaft 62 is blocked from being fully removed from cylindrical chamber 68. Additionally, when shaft 62 is fully extended out from lower housing 82, plunger 60 drops into the now empty space in cylindrical chamber 68 and thereby serves as a barrier to terminus 67 moving back into chamber 68.

As seen in FIGS. 14 and 16, the position of handle 47 when swing arm 43 is in the retracted configuration is visibly different from the position of handle 47 when swing arm 43 is in the extended position. This position difference is patent from a working distance and unlike prior art devices, the tow bar of the present invention does not require the user to manually handle the tow bar or inspect fixation devices to ensure that the tow bar is secured in either the retracted or extended configurations.

Figure 5:
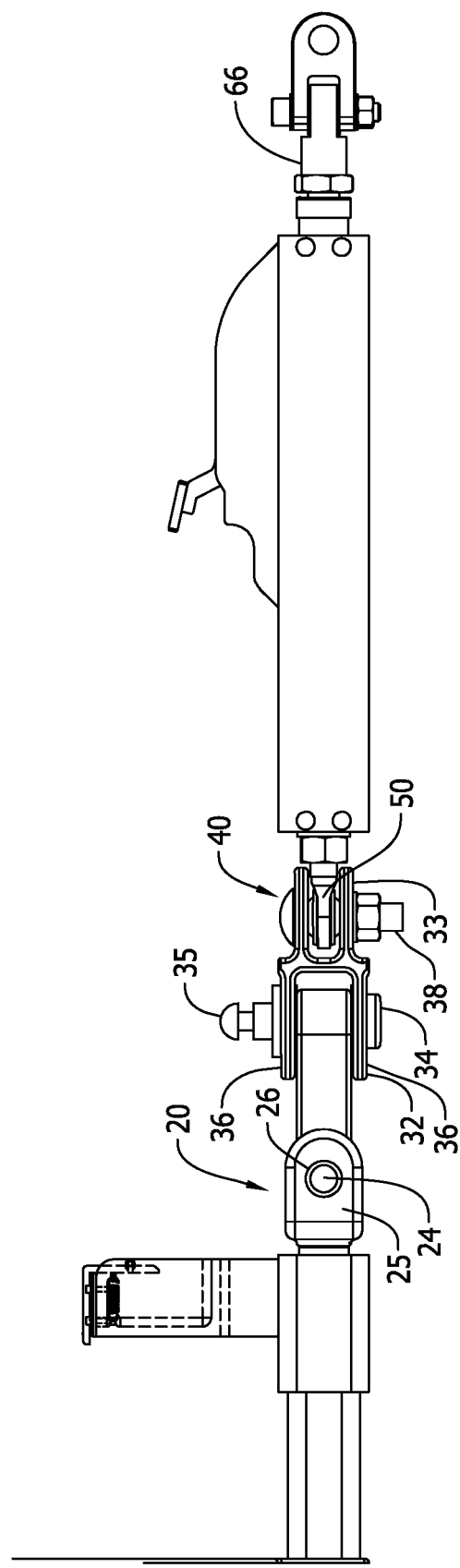
FIG. 5 is a side elevation view of an embodiment of the tow bar of the present invention, the swing arms of the tow bar are telescopically collapsed.
Figure 6:
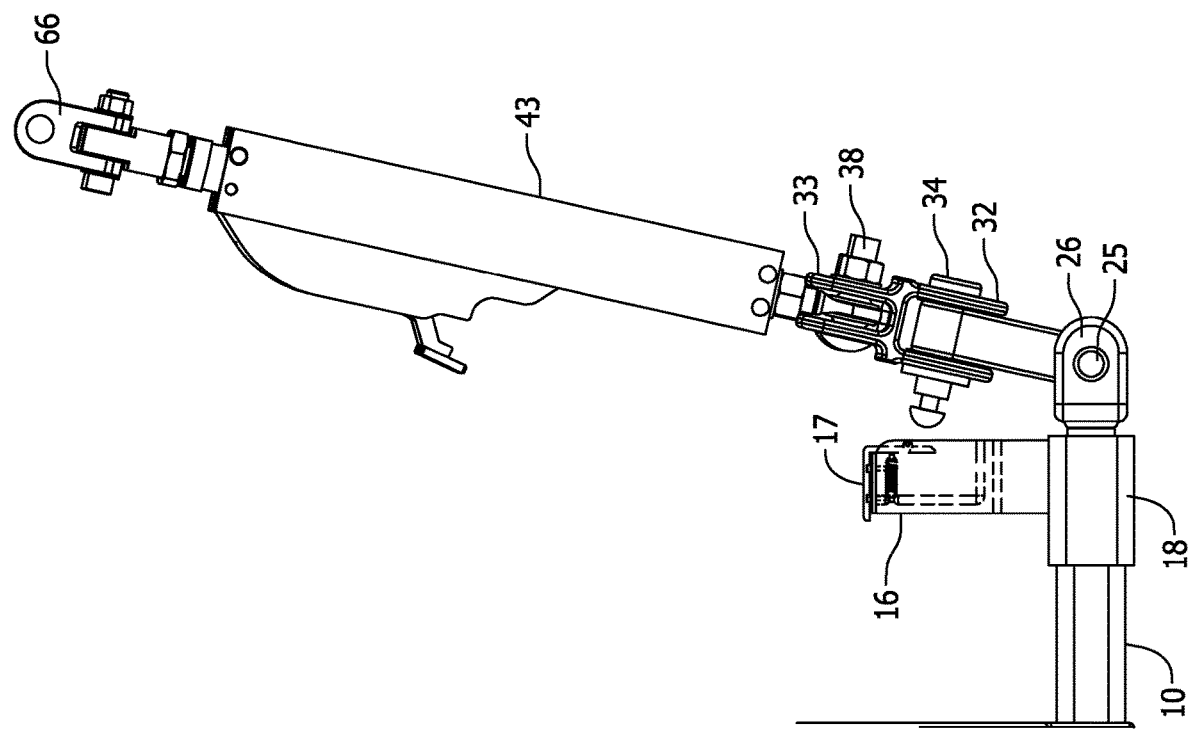
FIG. 6 is a side elevation view of an embodiment of the tow bar of the present invention, the swing arms of the tow bar are telescopically collapsed and have been pivoted upward in furtherance of placing the tow bar in the stow position.
Figure 7:
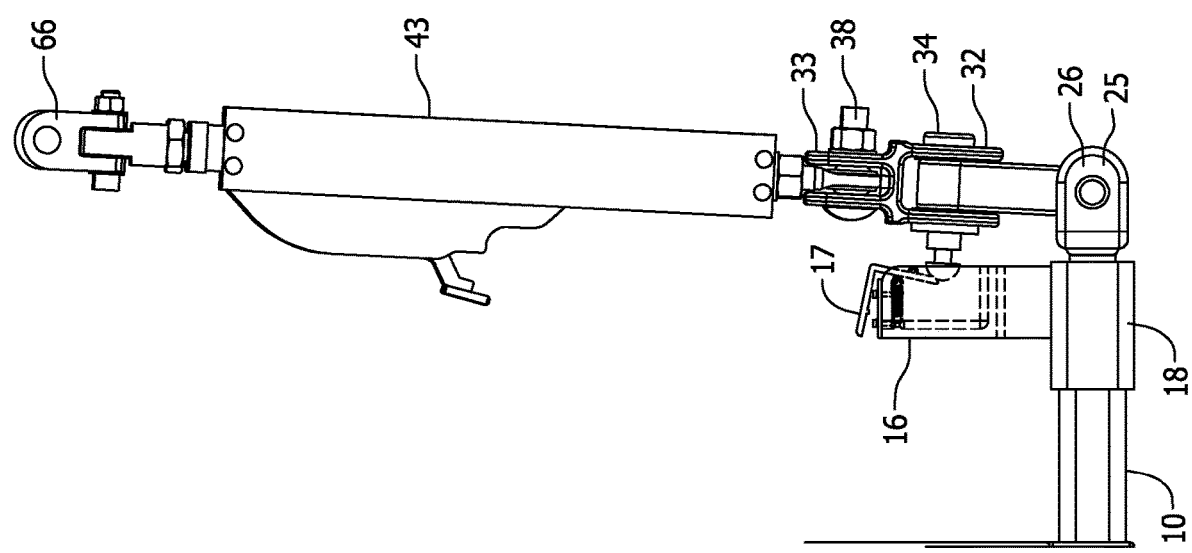
FIG. 7 is a side elevation view of an embodiment of the tow bar of the present invention, the swing arms of the tow bar are telescopically collapsed and have been further pivoted upward from the position shown in FIG. 6 in furtherance of placing the tow bar in the stow position. The catch button on the pin of the yoke has contacted and is pushing against the spring retention mechanism (latch) of the stowing mast.
Figure 8:
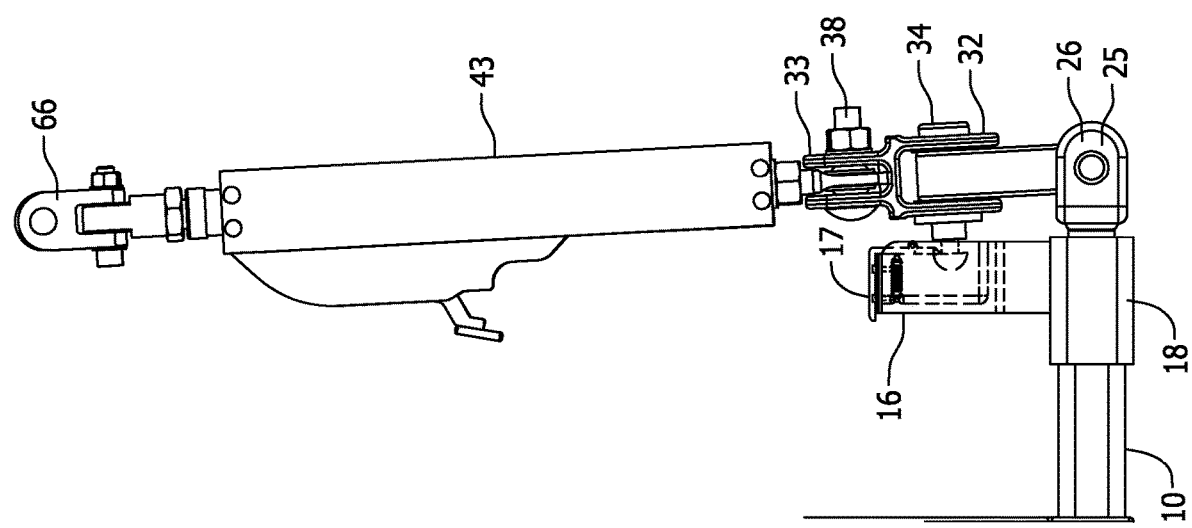
FIG. 8 is a side elevation view of an embodiment of the tow bar of the present invention, the swing arms of the tow bar are telescopically collapsed and have been further pivoted from the position shown in FIG. 7 toward the stowing mast in furtherance of placing the tow bar in the stow position. The spring retention mechanism (latch) of the stowing mast has engaged the catch button on the pin on the yoke.
Figure 9:
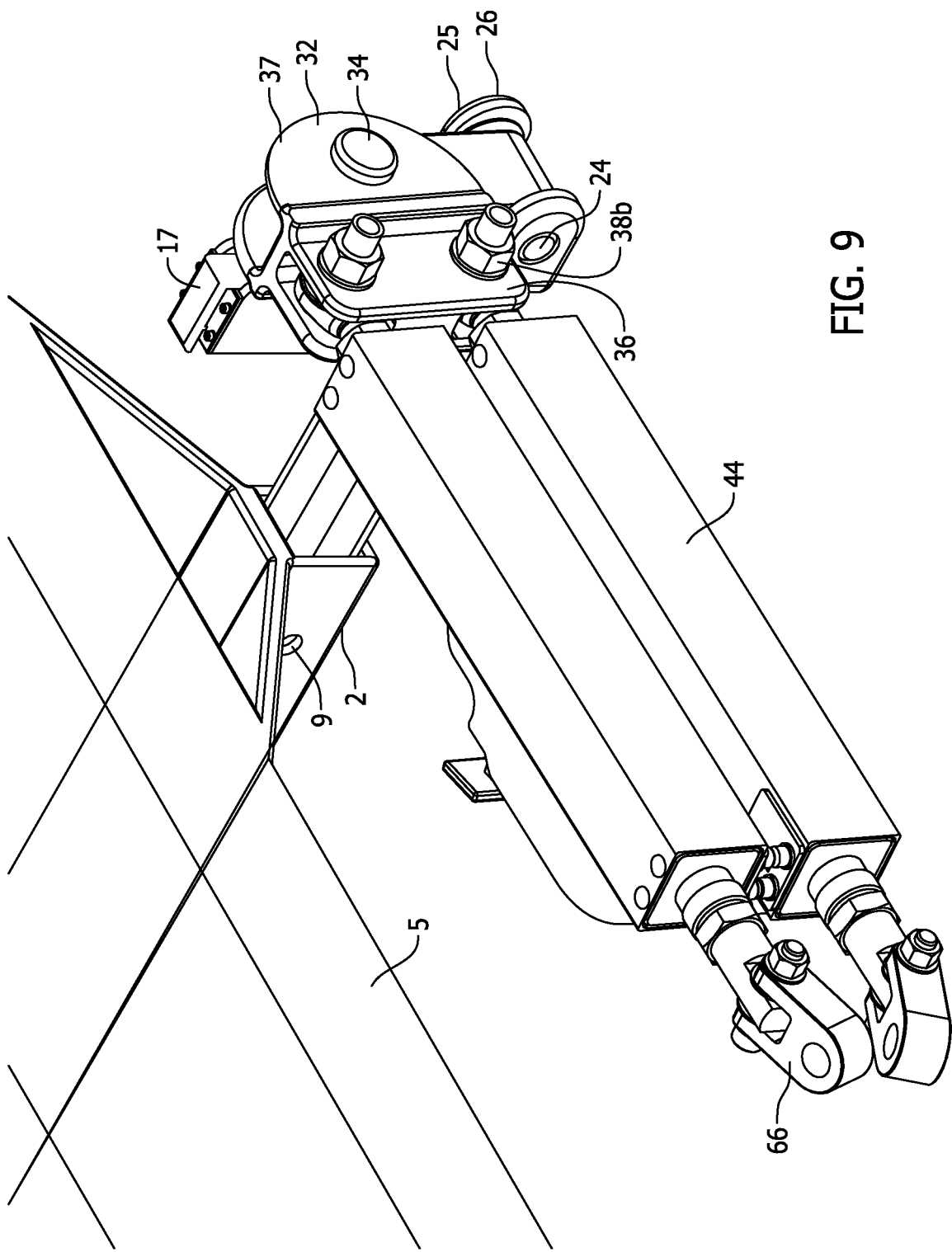
FIG. 9 is a perspective view of an embodiment of the tow bar of the present invention, the swing arms of the tow bar are telescopically collapsed and have been fully pivoted from the deployed position into a position in which the latch of the stowing mast has engaged the catch button on the pin on the yoke. The swing arms of the tow bar have been pivoted downward to one side at the back of the towing vehicle.
Figure 10:
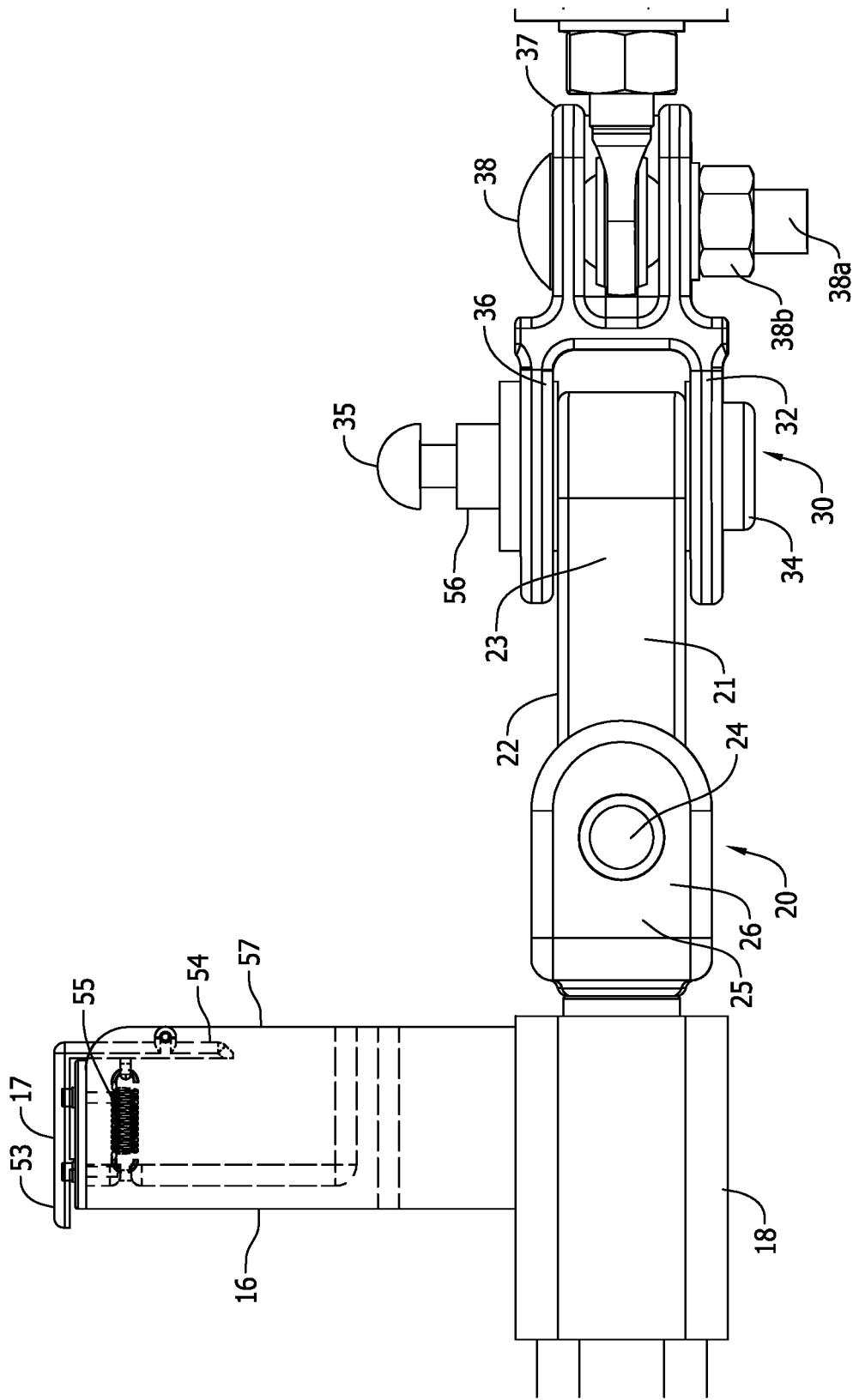
FIG. 10 is a fragmentary side elevation view showing the section of the tow bar containing the stowing mast, the first pivot coupler, the second pivot coupler and a heim joint of a third pivot coupler. The interior of the stowing mast is shown in phantom view so as to show the structural components of a preferred embodiment latch to hold the tow bar in its stowed position. The swing arms of the tow bar are in a horizontal position.
Figure 11:
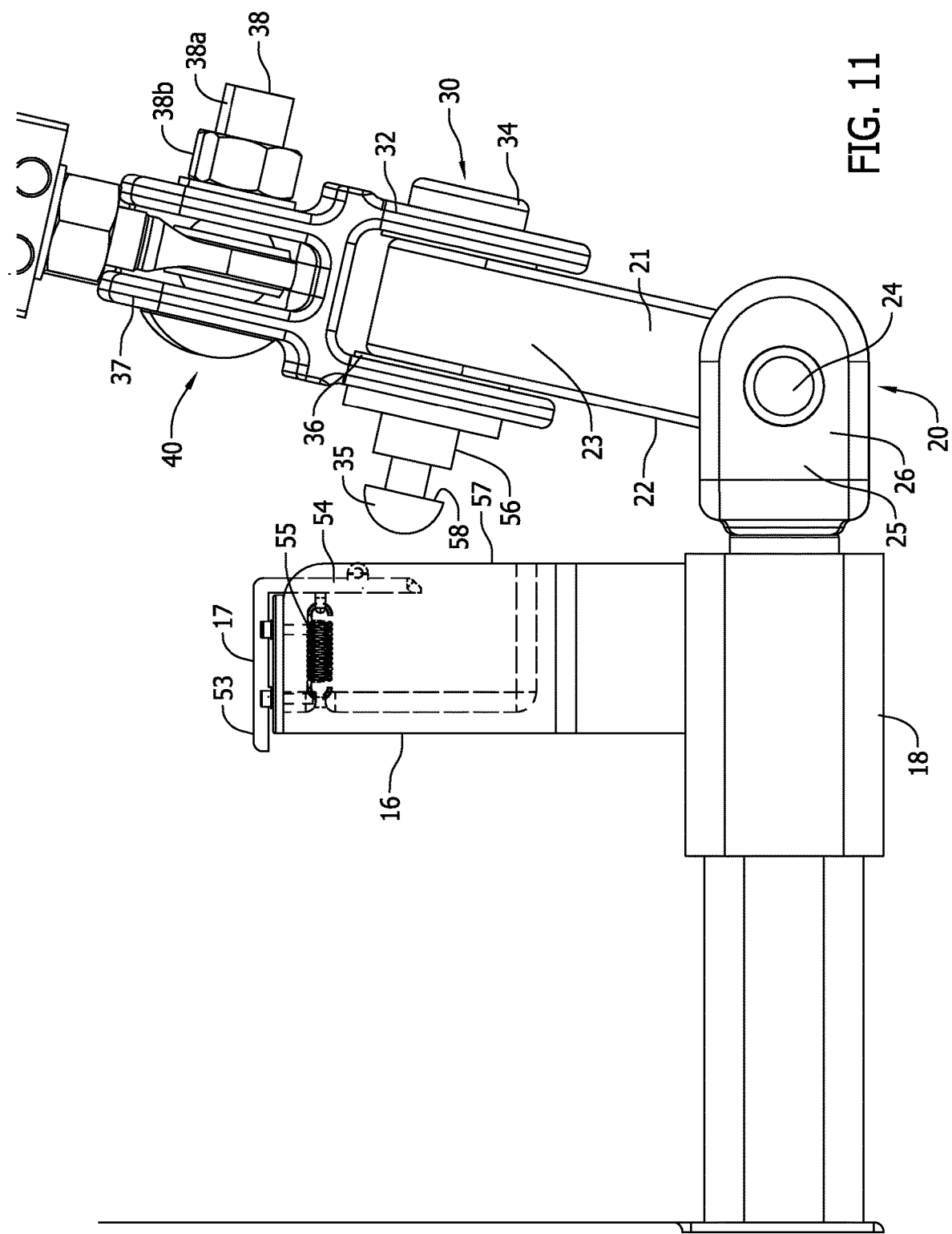
FIG. 11 is a fragmentary side elevation view showing the section of the tow bar containing the stowing mast, the first pivot coupler, the second pivot coupler and a heim joint of a third pivot coupler. The interior of the stowing mast is shown in phantom view so as to show the structural components of a preferred embodiment latch to hold the tow bar in its stowed position. The swing arms of the tow bar have been pivoted upward from their position shown in FIG. 10 in furtherance of bringing the catch button into engagement with the latch.
Figure 12:
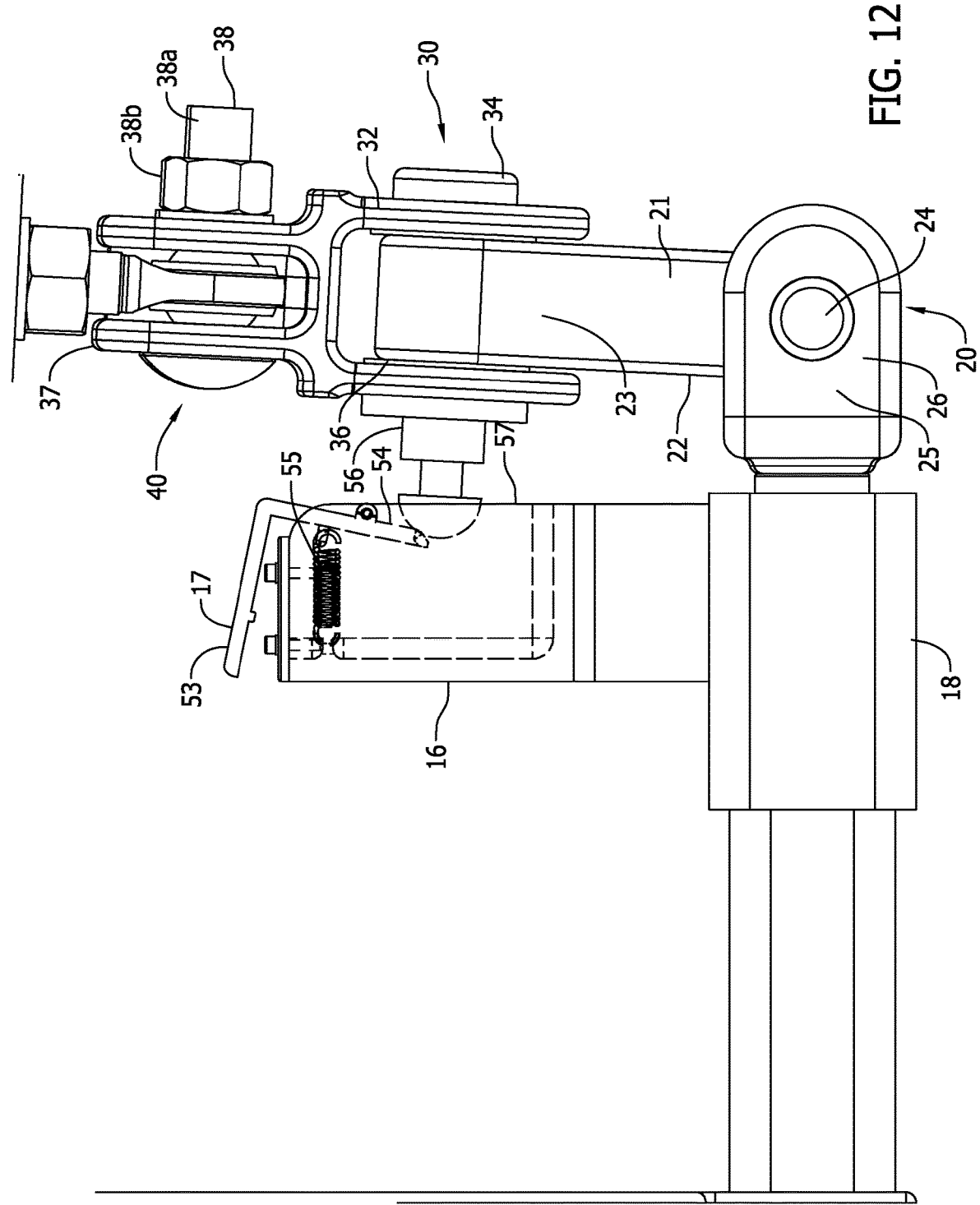
FIG. 12 is a fragmentary side elevation view showing the section of the tow bar containing the stowing mast, the first pivot coupler, the second pivot coupler and a heim joint of a third pivot coupler. The interior of the stowing mast is shown in phantom view so as to show the structural components of a preferred embodiment latch to hold the tow bar in its stowed position. The swing arms of the tow bar have been pivoted further from their position shown in FIG. 11 such that the catch button has contacted the spring retention structures of the latch.
Figure 13:
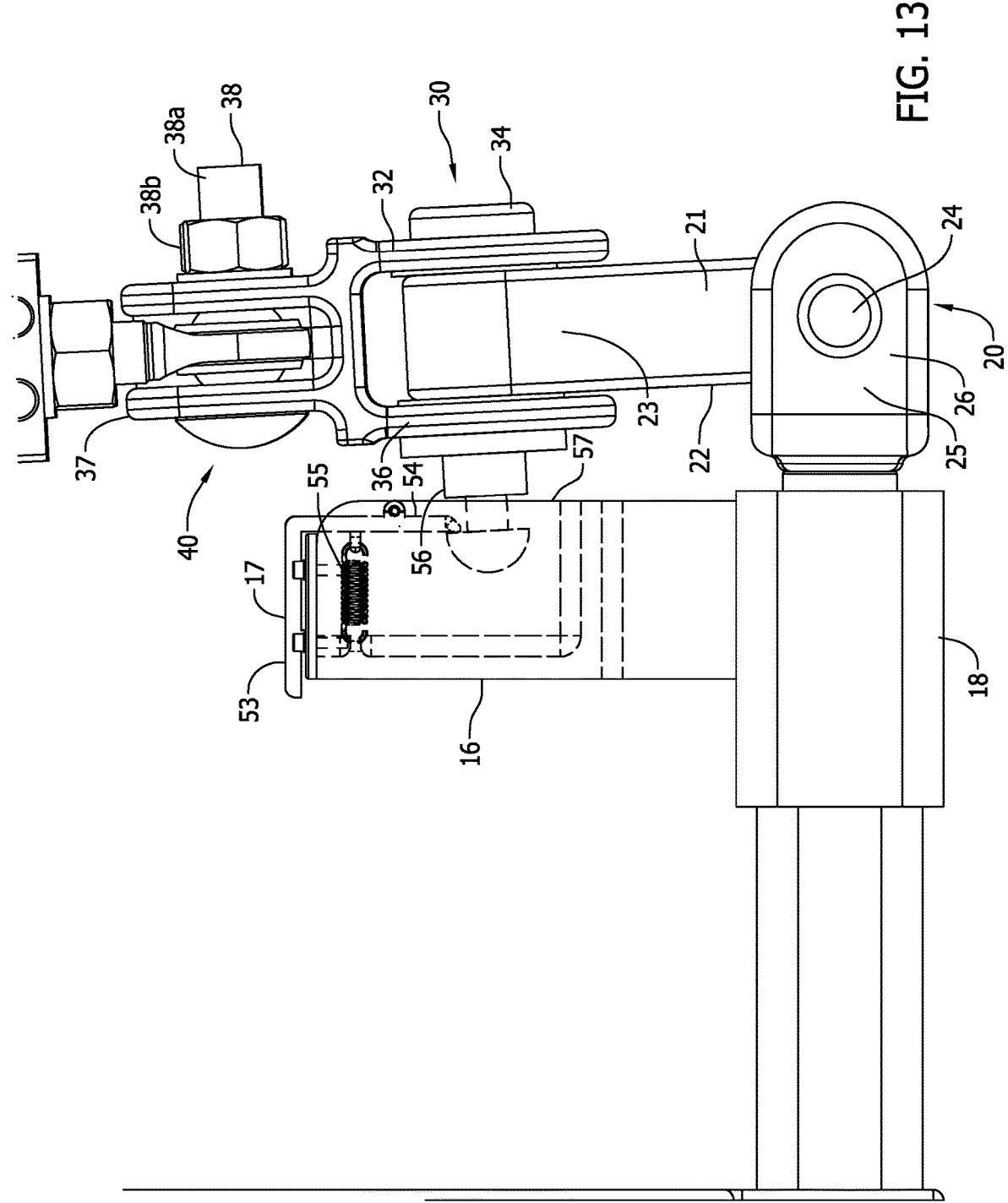
FIG. 13 is a fragmentary side elevation view showing the section of the tow bar containing the stowing mast, the first pivot coupler, the second pivot coupler and a heim joint of a third pivot coupler. The interior of the stowing mast is shown in phantom view so as to show the structural components of a preferred embodiment latch to hold the tow bar in its stowed position. The swing arms of the tow bar have been pivoted further from their position shown in FIG. 12 such that the latch has now engaged and is holding the catch button.

When shaft 62 is retracted into lower housing 82 of housing 44, tow bar 1 is in the preferred configuration for stowing. To stow tow bar 1, first, couplers 66 of swing arms 43 are disconnected from the towed vehicle. Then, swing arms 43 are adducted from their abducted "Y" configuration. From this point, FIGS. 5-13 demonstrate how tow bar 1 is placed in a stowing configuration. As shown by FIGS. 5 and 10, shafts 62 of distal ends 42 of both swing arms 43 are retracted into housing 44. Then, as shown in FIGS. 6 and 11, swing arms 43 with retracted distal ends 42 are lifted upward. In the disclosed embodiment, this upward lifting motion causes tow bar 1 to pivot at first pivot coupler 20. Hence, when swing arms 43 are upwardly pivoted so are pivot bar 21 and yoke 31. As shown in FIGS. 7 and 12, continuing to rotate swing arms 43 about first pivot coupler 20 causes catch button 35 on pin 34 to contact and press against pawl 54 of latch 17 on mast 16. In an alternate embodiment, catch button 35 could be located on pivot bar 21 or arms 43. Pawl 54 is retained in its default position by spring 55. When swing arms 43 are further rotated about first pivot coupler 20, catch button 35 moves past pawl 54 allowing pawl 54 to return to its default position. Due to the weight of swing arms 43 and the connected structure of pivot bar 21 and yoke 31, distal face 58 of catch button 35 is now held by spring-actuated pawl 54. To release catch button 35, swing arms 43 are rotated proximally toward the towing vehicle until collar 56 on pin 34 contacts the distal side of pawl 54. From this point, latch grasping portion 53 is lifted (pivoted distally upward) causing pawl 54 to rise above catch button 35, which in turn allows catch button 35 to be removed from its held position within mast 16. By virtue of the close proximity of collar 56 to distal face 58, when catch button 35 is held by pawl 54, there is very limited back and forth movement of swing arms 43 allowed by pawl 54. This limited movement combined with the spring-enabled positioning of latch 17 reduces the chance of the tow bar shaking free from its stowed position. Once pawl 54 engages catch button 35, tow bar 1 can be placed in its fully stowed configuration as depicted in FIG. 9. To place the tow bar in this fully stowed configuration, swing arms 43 of tow bar 1 are rotated about second pivot coupler 30 to one side or the other of towing vehicle 5.

Figure 19A:
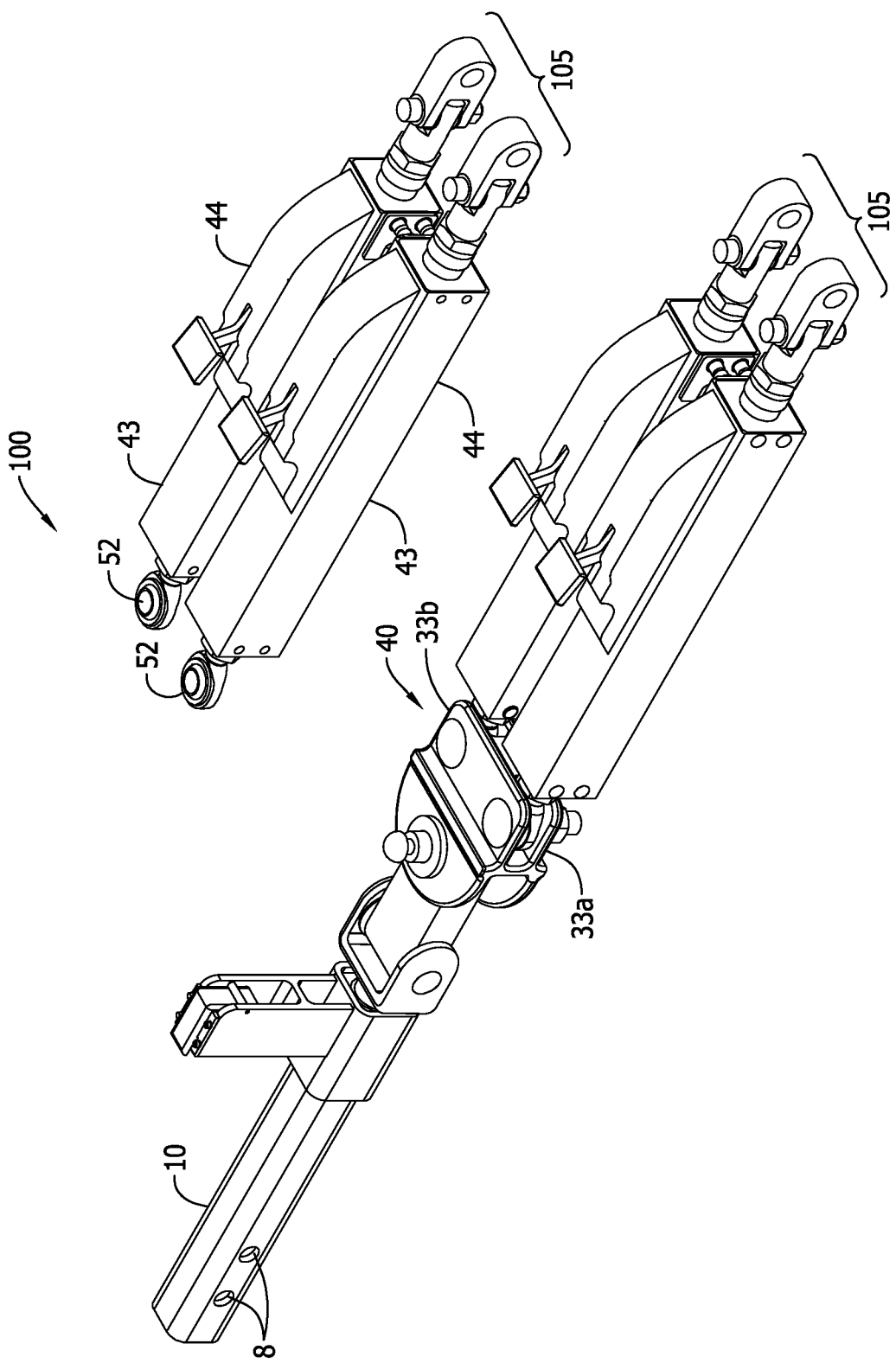
FIGS. 19A-19F show embodiment towing systems having a plurality of removably connectable swing arm sets that can be interchanged with the yoke of the tow bar. In the case of the system of FIGS. 19A-19C, the pair of swing arms in each arm set has a drawing capacity different than the drawing capacity of the pairs of swing arms in the other arm sets of the plurality of arm sets. In the case of the system of FIGS. 19D-19F, the embodiment system includes interchangeable swing arms, including, not limitedly, one having wiring allowing for the electrical coupling of the towing vehicle to the towed vehicle or accessories.
Figure 19B:
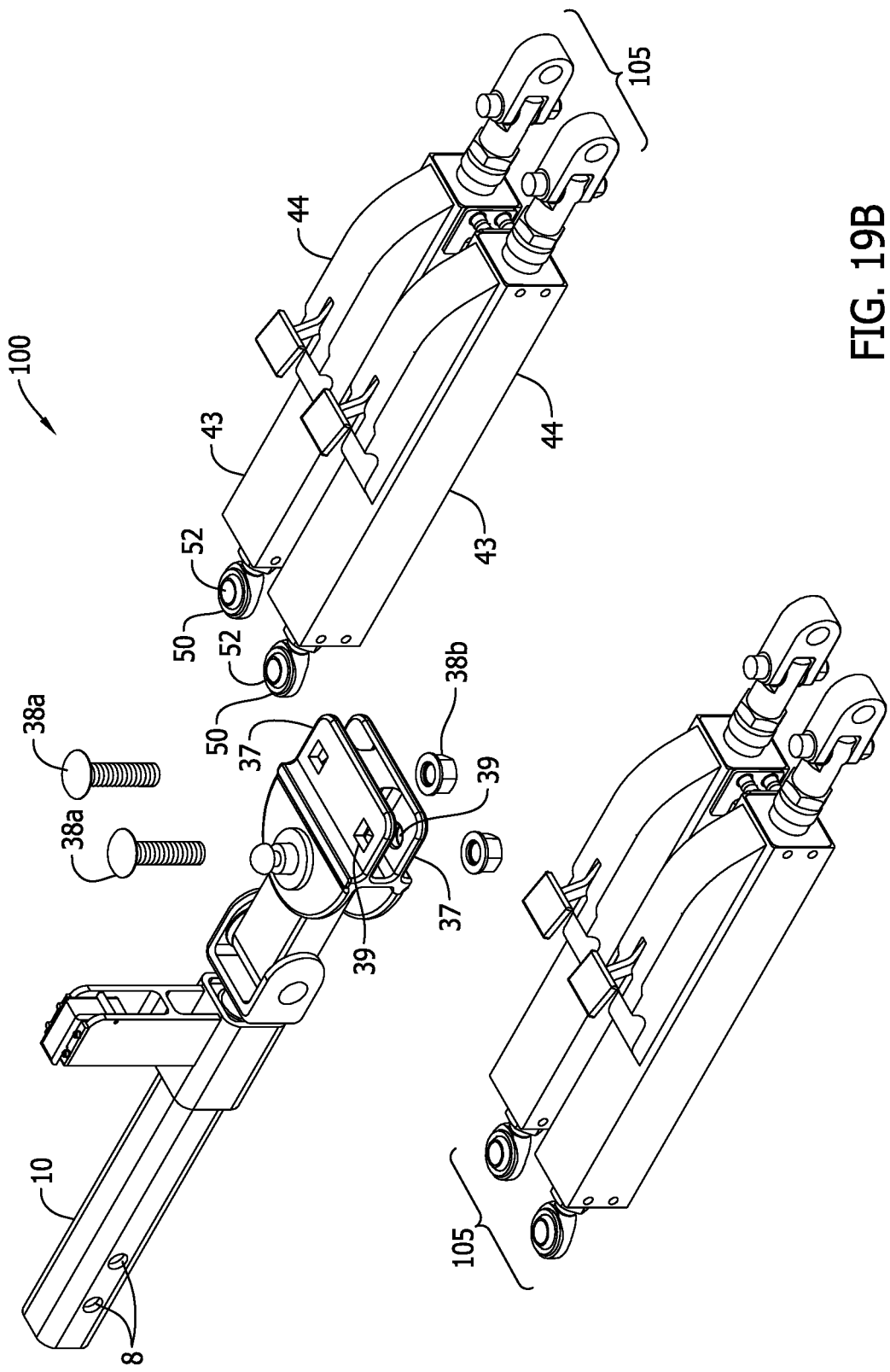
Figure 19C:
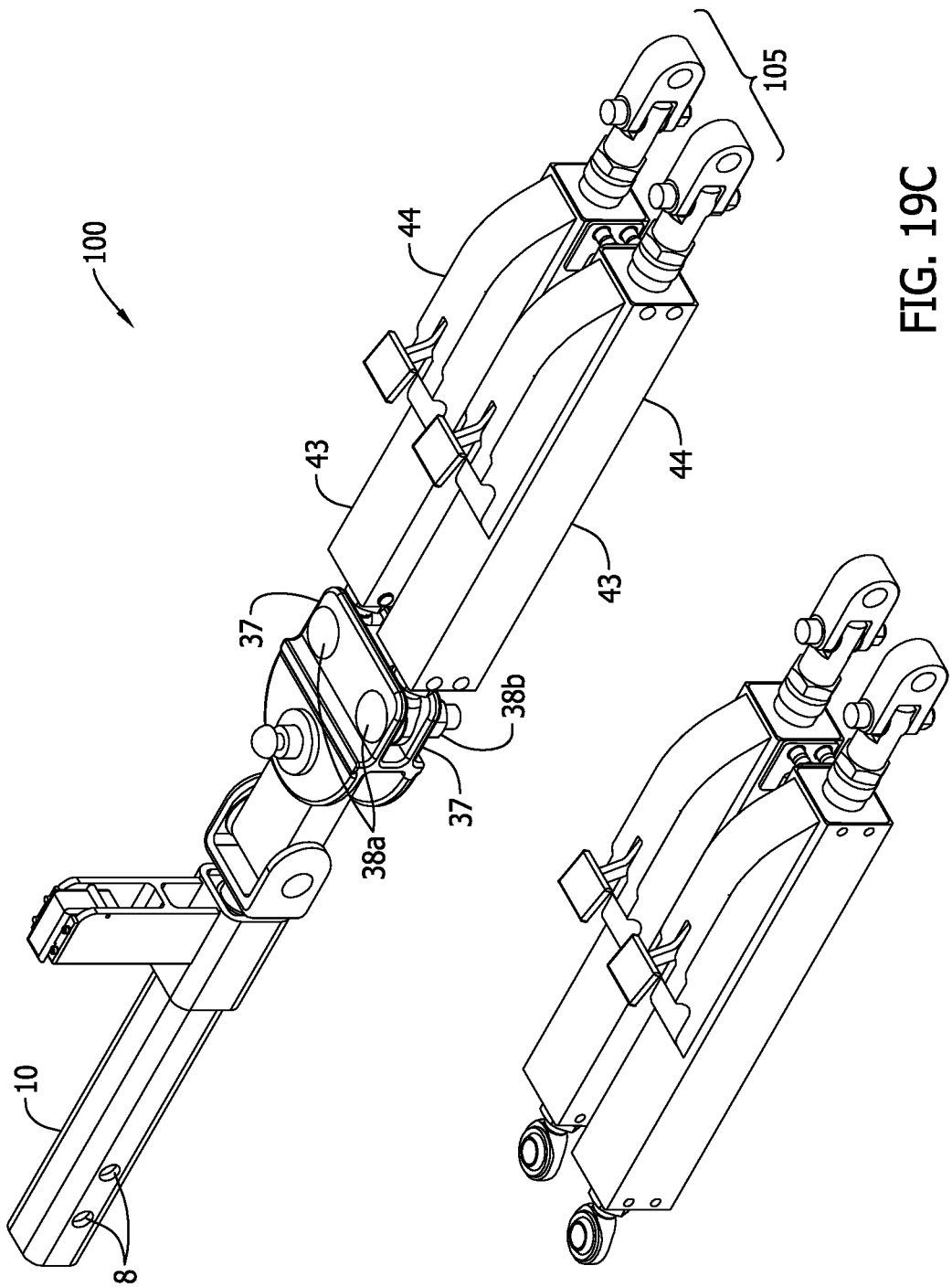

The invention is also directed to a vehicle towing system 100 comprising a tow bar 1 having the features described above but including a plurality of pairs 105 of swing arms 43 that can be interchangeably installed onto third clevises 33a, 33b of bracket 33 of yoke 31. The inventive system 100 is shown in FIGS. 19A-19C. As shown in these figures, system 100 includes tow bar 1 for connecting a towing hitch receiver 2 secured to a towing vehicle 3 to a towing connector 4 secured to a towed vehicle 6. Tow bar 1 comprises shank 10. Shank 10 preferably has top side 11, bottom side 12, two lateral sides 13, proximal end 14 and distal end 15. Proximal end 14 of shank 10 is shaped and sized to releasably connect to towing hitch receiver 2.

First pivot coupler 20 includes first clevis 25 connected to distal end 15 of hitch shank 10. First pivot coupler 20 pivotally connects shank 10 to pivot bar 21, preferably in the manner described above. Pivot bar 21 has proximal end 22 and distal end 23. Second pivot coupler 30 pivotally connects distal end 23 of pivot bar 21 to yoke 31 preferably in the manner described above. Second pivot coupler 30 allows pivotal movement in a direction generally perpendicular to that of the first pivot coupler 20. Yoke 31 has distal bracket portion (clevis) 33.

The embodiment system 100 includes a plurality of arm pairs 105. Each of the plurality of arm pairs (set) 105 includes a pair of swing arms 43. Each swing arm 43 in each arm set 105 has proximal end 41 and distal end 42 and is preferably of the construct described above with respect to tow bar 1. Proximal end 41 of each arm 43 in each arm pair 105 is removably connectable to a clevis 33a, 33b on bracket 33 of third pivot coupler 40. Third pivot coupler 40 allows horizontal pivot motion. However, as with the case of tow bar 1, in system 100, third pivot coupler 40 is preferably a heim joint allowing swing arm 43 to limitedly pivot vertically relative to yoke 31. The pair of swing arms 43 in each arm pair 105 has a drawing capacity different than the drawing capacity of the pairs of arms 43 in the other arm pairs 105 of the plurality of arm sets. This way, the towing system can be used to tow different size loads. In a preferred embodiment, distal end 41 of each arm 43 includes a coupler 66 for attachment to towing connector 4 on towed vehicle 6. In order to make arms 43 of each arm pair interconnectable and interchangeable within plates 37 of third clevises 33a, 33b, bolts 38a and lock nuts 38b should be used, instead of a permanently affixed pin, to attach heim joint 50 to clevis 33a or 33b. In this way, the swing arms 43 of each pair 105 of swing arms are releasably attachable to clevises 33a, 33b.

In the preferred embodiment one or more of the arm pairs 105 includes arms 43 which are extendable and include a lock 46 to hold arms 43 at their extended length. Lock 46 is capable of assuming a locked and unlocked position and includes an indicator in the form of handle 47 visually indicating when lock 46 is in the locked and unlocked position.

Figure 19D:
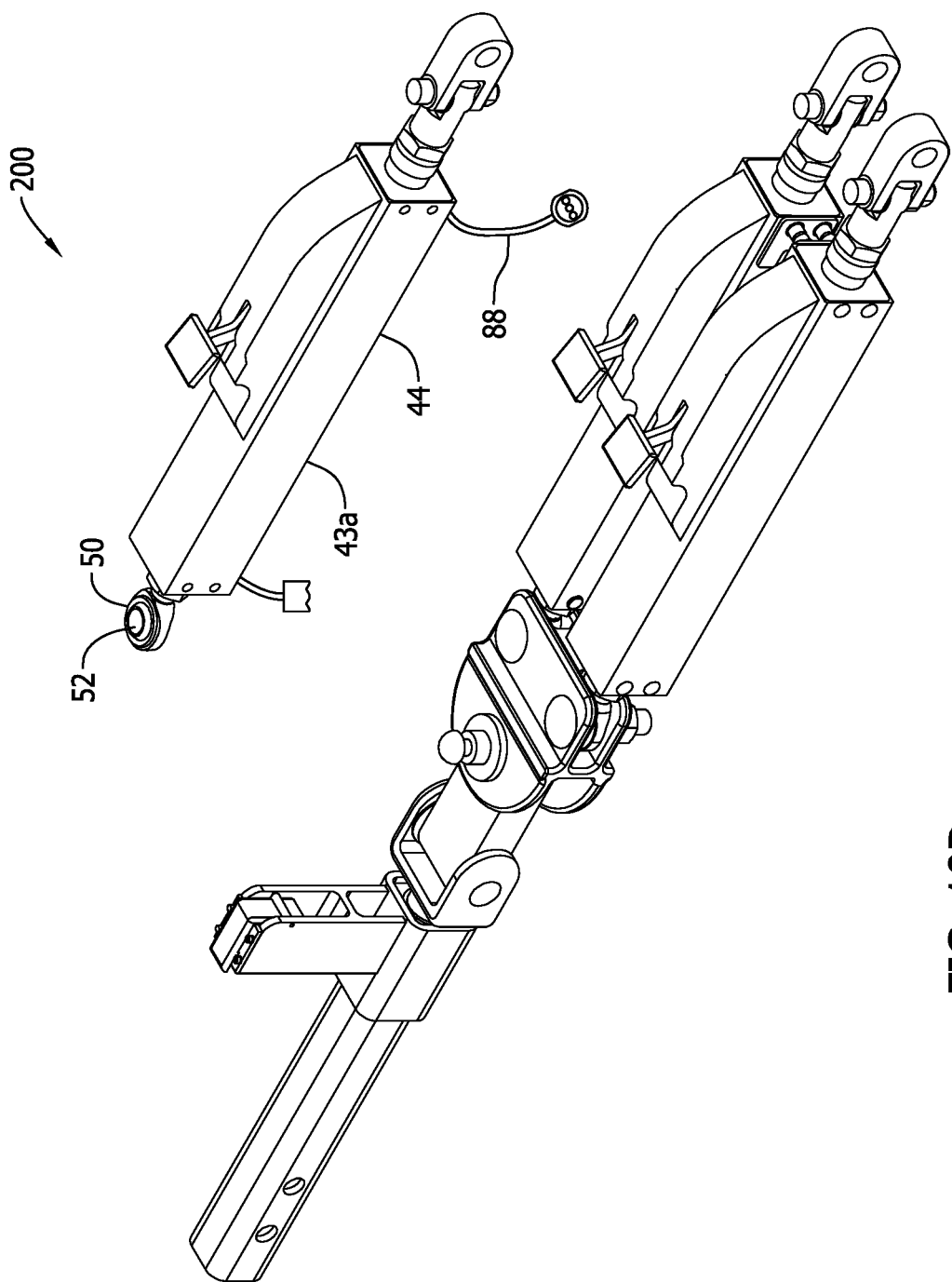
Figure 19E:
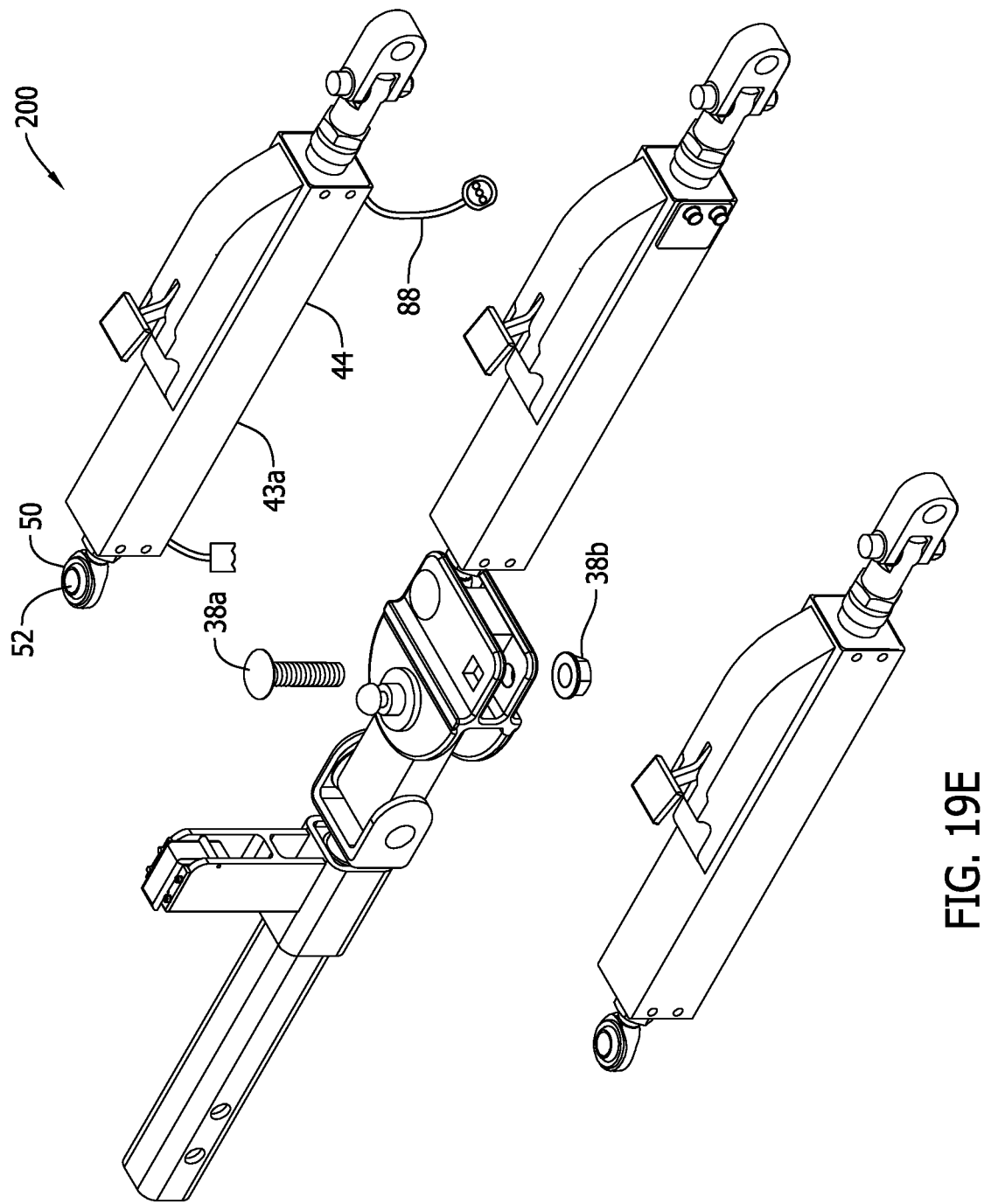
Figure 19F:
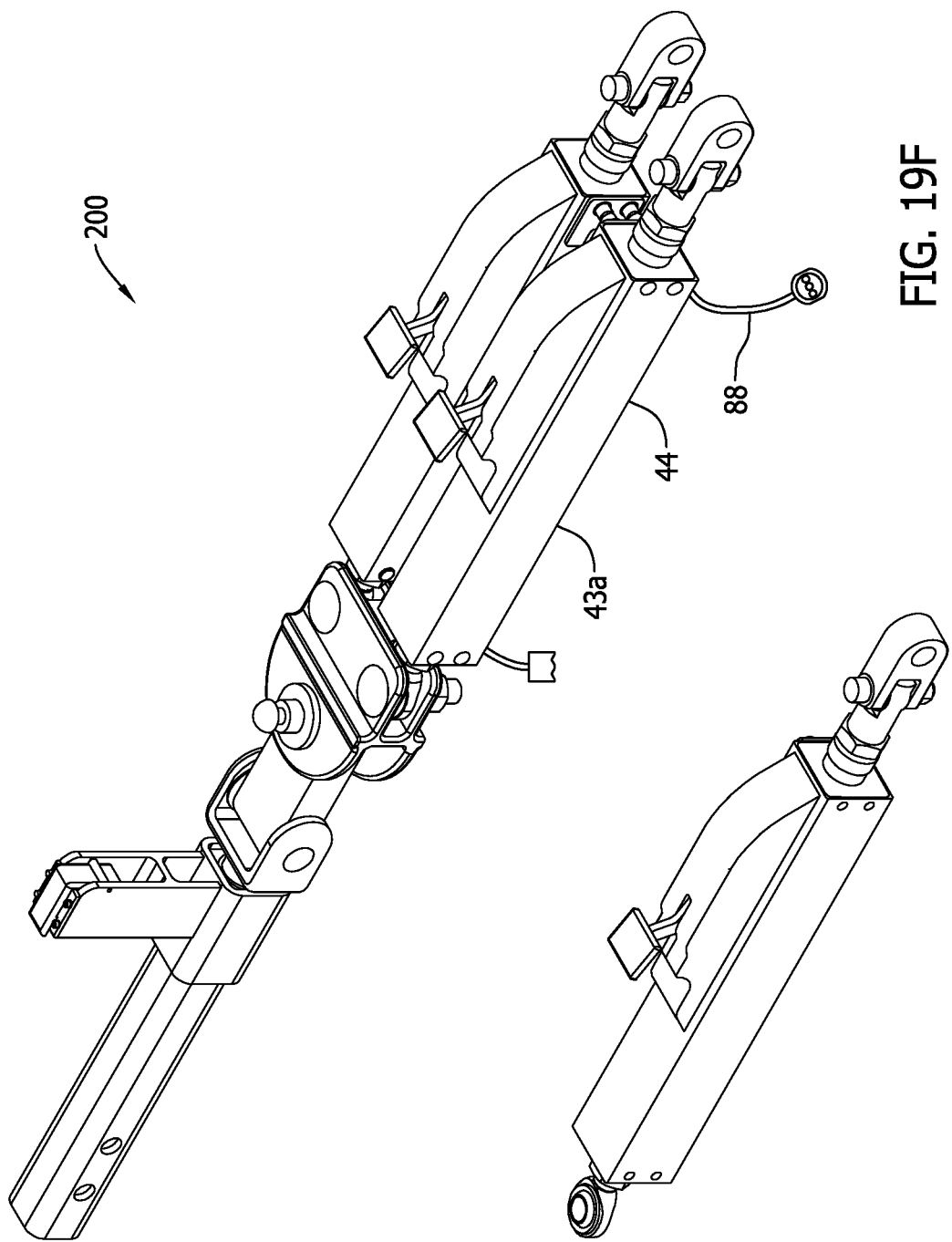

The invention is also directed to a vehicle towing system 200 comprising a tow bar 1 having the feature of removably securable arms 43 described above. In a more preferred embodiment of this system, system 200 includes a swing arm 43a that can be interchangeably installed onto clevis portions either of 33a, 33b of bracket 33 of yoke 31. An embodiment of the inventive system 200 is shown in FIGS. 19D-19F. The embodiment system 200 may include swing arm 43a including wiring 88 that allows for the electrical coupling of the towing vehicle to the towed vehicle or to accessories on the towed vehicle such as lights. In the preferred embodiment, wiring 88 retracts into and extends out from housing 44 of swing arm 43a to bridge the needed distance between the towing vehicle and towed vehicle or accessories on the towed vehicle.

It is to be understood that while certain forms of the present invention have been illustrated and described herein, it is not to be limited to the specific forms or arrangement of parts as described and shown. Those forms and arrangements are merely preferred embodiments. As will be apparent to one of ordinary skill in the art, the preferred embodiments of the invention have been set forth in the drawings and written description, and although specific terms may have been employed, these are used in an exemplary sense only and are not used for purposes of limitation. Changes in the form and proportion of parts as well as in the substitution of equivalents are contemplated as circumstances may sug-

What is claimed is:

1. A tow bar for connecting a towing hitch receiver on a towing vehicle to a towed vehicle having two towing brackets, the tow bar comprising:
    a shank, the shank having a proximal end and a distal end, the proximal end of the shank being shaped and sized to releasably connect to the towing hitch receiver;
    a pivot bar having a proximal end and a distal end;
    a first pivot coupler pivotally connecting the distal end of the shank to the pivot bar;
    a second pivot coupler pivotally connecting the pivot bar to a yoke, the second pivot coupler allowing pivotal movement in a direction substantially perpendicular to that of the first pivot coupler;
    a pair of arms, each arm having a proximal end and a distal end;
    two third pivot couplers, each third pivot coupler connecting one of the pair of arms to the yoke, each third pivot coupler allowing its connected arm to pivot horizontally;
    the tow bar including a first clevis attached to the distal end of the shank;
    the first pivot coupler including the first clevis, the proximal end of the pivot bar and a pin inserted through the first clevis and the proximal end of the pivot bar;
    the yoke including a proximal bracket that forms a second clevis; and
    the second pivot coupler includes the distal end of the pivot bar, the second clevis and a pin inserted through the second clevis and the distal end of the pivot bar.

2. The tow bar of claim 1 wherein the proximal end of each arm includes a heim joint allowing the arm to pivot vertically.

3. The tow bar of claim 2 wherein:
    the yoke includes a distal bracket;
    the distal bracket includes two laterally displaced third clevises; and
    each third pivot coupler includes one of the laterally displaced third clevises, the proximal end of one of the arms and a pin.

4. The tow bar of claim 1 wherein the first clevis is rotatably attached to the distal end of the shank.

5. The tow bar of claim 2 wherein the first clevis is rotatably attached to the distal end of the shank.

6. The tow bar of claim 3 wherein the first clevis is rotatably attached to the distal end of the shank.

7. The tow bar of claim 1 wherein each arm is extendable and includes a lock to hold the arm at an extended length, the lock capable of assuming a locked and unlocked position and including a positionable handle visually indicating by position when the lock is in the locked and unlocked positions.

8. The tow bar of claim 5 wherein each arm is extendable and includes a lock to hold the arm at an extended length, the lock capable of assuming a locked and unlocked position and including a positionable handle visually indicating by position when the lock is in the locked and unlocked positions.

9. The tow bar assembly of claim 1 wherein:
    the tow bar includes a mast connected to the shank;
    the yoke includes a catch button; and
    the mast includes a latch that engages the catch button when the yoke of the tow bar is pivoted upward and into contact with the mast.

10. The tow bar assembly of claim 2 wherein:
    the tow bar includes a mast connected to the shank
    the yoke includes a catch button; and
    the mast includes a latch that engages the catch button when the yoke of the tow bar is pivoted upward and into contact with the mast.

11. The tow bar assembly of claim 6 wherein:
    the tow bar includes a mast connected to the shank;
    the yoke includes a catch button; and
    the mast includes a latch that engages the catch button when the yoke of the tow bar is pivoted upward and into contact with the mast.

12. A vehicle towing system, the system comprising:
    a tow bar for connecting a towing hitch receiver secured on a towing vehicle to towing brackets secured to a towed vehicle, the tow bar comprising:
        a shank, the shank having a proximal end and a distal end, the proximal end of the shank being shaped and sized to releasably connect to the towing hitch receiver;
        a pivot bar having a proximal end and a distal end;
        a first pivot coupler connecting the distal end of the shank to the pivot bar;
        a yoke;
        a second pivot coupler connecting the pivot bar to the yoke, the second pivot coupler allowing pivotal movement in a direction substantially perpendicular to that of the first pivot coupler;
        a plurality of arm sets, each of the plurality of arm sets including a pair of arms and each arm in each arm set having a proximal end and a distal end;
        two third pivot couplers, each third pivot coupler removably connecting the proximal end of one of the arms in each arm set to the yoke, each third pivot coupler allowing its connected arm to move horizontally;
        the pair of arms in each arm set having a drawing capacity different than the drawing capacity of the pair of arms in any other set of the plurality of arm sets; and
        each third pivot coupler including a heim joint allowing the m to pivot vertically relative to the yoke.

13. The towing system of claim 12 further including a first clevis attached to the distal end of the shank and the first pivot coupler includes the first clevis, the proximal end of the pivot bar and a pin inserted through the clevis and the proximal end of the pivot bar.

14. The towing system of claim 13 wherein the first clevis is rotatably attached to the distal end of the shank.

15. A vehicle towing system, the system comprising:
    a tow bar for connecting a towing hitch receiver secured to a towing vehicle to towing brackets secured to a towed vehicle, the tow bar comprising:
        a shank, the shank having a proximal end and a distal end, the proximal end of the shank being shaped and sized to releasably connect to the towing hitch receiver;
        a pivot bar having a proximal end and a distal end;
        a first pivot coupler connecting the distal end of the shank to the pivot bar;
        a yoke;
        a second pivot coupler connecting the pivot bar to the yoke, the second pivot coupler allowing pivotal movement in a direction substantially perpendicular to that of the first pivot coupler,
    a set of arms, each arm in the set having a proximal end and a distal end;

the proximal end of each arm being removably connectable to the yoke via either of two third pivot couplers, each third pivot coupler allowing its connected arm to move horizontally; and one of the arms in the set of arms includes wiring to electrically couple a towing vehicle to a towed vehicle or accessory on the towed vehicle.

16. The towing system of claim 15 wherein each third pivot coupler includes a heim joint allowing its connected arm to pivot vertically relative to the bracket.

17. The towing system of claim 15 further including a first clevis attached to the distal end of the shank and the first pivot coupler includes the first clevis, the proximal end of the pivot bar and a pin inserted through the clevis and the proximal end of the pivot bar.

18. The towing system of claim 16 wherein the first clevis is rotatably attached to the distal end of the shank.

* * * * *